(12) United States Patent
Tang et al.

(10) Patent No.: US 6,636,849 B1
(45) Date of Patent: Oct. 21, 2003

(54) DATA SEARCH EMPLOYING METRIC SPACES, MULTIGRID INDEXES, AND B-GRID TREES

(75) Inventors: Yuanhua Tom Tang, San Jose, CA (US); Yonghong Grace Yang, San Jose, CA (US)

(73) Assignee: GenMetrics, Inc., San Jose, CA (US)

( * ) Notice: Subject to any disclaimer, the term of this patent is extended or adjusted under 35 U.S.C. 154(b) by 348 days.

(21) Appl. No.: 09/718,573

(22) Filed: Nov. 22, 2000

Related U.S. Application Data

(60) Provisional application No. 60/167,045, filed on Nov. 23, 1999.

(51) Int. Cl.[7] .............................. G06F 17/30; G06F 7/00
(52) U.S. Cl. ........................ 707/6; 707/2; 707/3; 707/5; 707/10
(58) Field of Search ...................... 707/1–10, 100–104.1

(56) References Cited

U.S. PATENT DOCUMENTS

| | | | | |
|---|---|---|---|---|
| 3,881,921 | A | * 5/1975 | Frank | ........................ 430/53 |
| 4,136,395 | A | 1/1979 | Kolpek et al. | |
| 4,490,811 | A | 12/1984 | Yilanilos et al. | |
| 4,689,768 | A | 8/1987 | Heard et al. | |
| 5,276,741 | A | 1/1994 | Aragon | |
| 5,701,256 | A | 12/1997 | Marr et al. | |
| 5,765,180 | A | 6/1998 | Travis | |
| 5,978,797 | A | 11/1999 | Yilanilos | |
| 6,017,282 | A | * 1/2000 | Stefonsky | ................ 473/406 |
| 6,446,068 | B1 | * 9/2002 | Kortge | ........................ 707/6 |
| 6,470,287 | B1 | * 10/2002 | Smartt | ...................... 702/102 |

OTHER PUBLICATIONS

Daryl Lawrence Bonhaus, "An Upwind Multigrid Method for Solving Viscous Flows on Unstructured Triangular Meshes", Angus 13, 1993, The Shool of Engineering and Applied Science, pp. 1–48.*
Pearson, W.R., et al., "Comparison of DNA sequences with protein sequences," *Genomics*, 1997, 46, 24–36.
Rosenthan, S., "The PF474 chip, a coprocessor for string comparison," *Byte*, 1984, pp. 247–256.
Sahni,S., et al., "P–complete approximation problems," *JACM*, 1976, 23, 555–565.
Smith, T.F., et al., "Identification of common molecular subsequences," *J. Mol. Biol*, 1981, 147, 195–197.
Altschul, S.F., et al., "Gapped BLAST and PSI–B1AST: a new generation of protein database search programs," *Nucleic Acids Research*, 1997, 25, 3389–3402.
Altschul, S.F., et al., "Basic Local Alignment," *J. Mol. Biol*, 1990, 215, 403–410.
Bayer, R., et al., "Organization and maintenance of large ordered indexes," *Acta Informatica*, 1972, 1 (3), 173–189.
de la Vega, W.F., et al., "A randomized approximation scheme for Metric MAX_CUT", *FOCS*, 1998, pp. 1–4.
Garg, N., et al., Approximate max–flow min–(multi)–cut theorems and their applications, *SICOMP*, 1996, 25, 235–251.
Hall, Patrick A.V., et al., "Approximate String Matching," *ACM Computing Surveys*, 1980, 12 (4), 381–402.
Indyk, Piotr, "A sublinear time approximation scheme for clustering in metric spaces," pp. 1–6.
Needleman, S.B., et al., "A general method applicable to the search for similarities in the amino acid sequence of two proteins," *J. Mol. Biol*, 1970, 48, 443–453.
Pearson, W.R., "Rapid and sensitive sequence comparison with FASTP nd FASTA" *In methods in Enzymology, Academic Press*, 1990, 183, 63–98.

* cited by examiner

*Primary Examiner*—Greta Robinson
*Assistant Examiner*—Linh Black
(74) *Attorney, Agent, or Firm*—Woodcock Washburn LLP

(57) ABSTRACT

Systems and methods for generating indexes and fast searching of "approximate", "fuzzy", or "homologous" matches for a large quantity of data in a metric space are provided. The data is indexed to generate a search tree taxonomy. Once the index is generated, a query can be provided to report all hits within a certain neighborhood of the query. In an even faster implementation, the invention may be used together with existing approximate sequence comparison algorithms, such as FASTA and BLAST. Here, a local distance of a local metric space is used to generate local search tree branches. Applications of this invention may include homology search for DNA and/or protein sequences, textual or byte-based searches, literature search based on lists of keywords, and vector and matrix based indexing and searching.

29 Claims, 12 Drawing Sheets

400

Definition: Given
$p_1 = (x_1, y_1)$,
$p_2 = (x_2, y_2)$, define
$d(p_1, p_2) = \max(|x_1-x_2|, |y_1-y_2|)$ Dark circle: grid point
Open circle: other point
Grid size: $\delta = 0.5$ Query point: $q = (2.2, 1.8)$,
Neighborhood: $\varepsilon = 0.3$

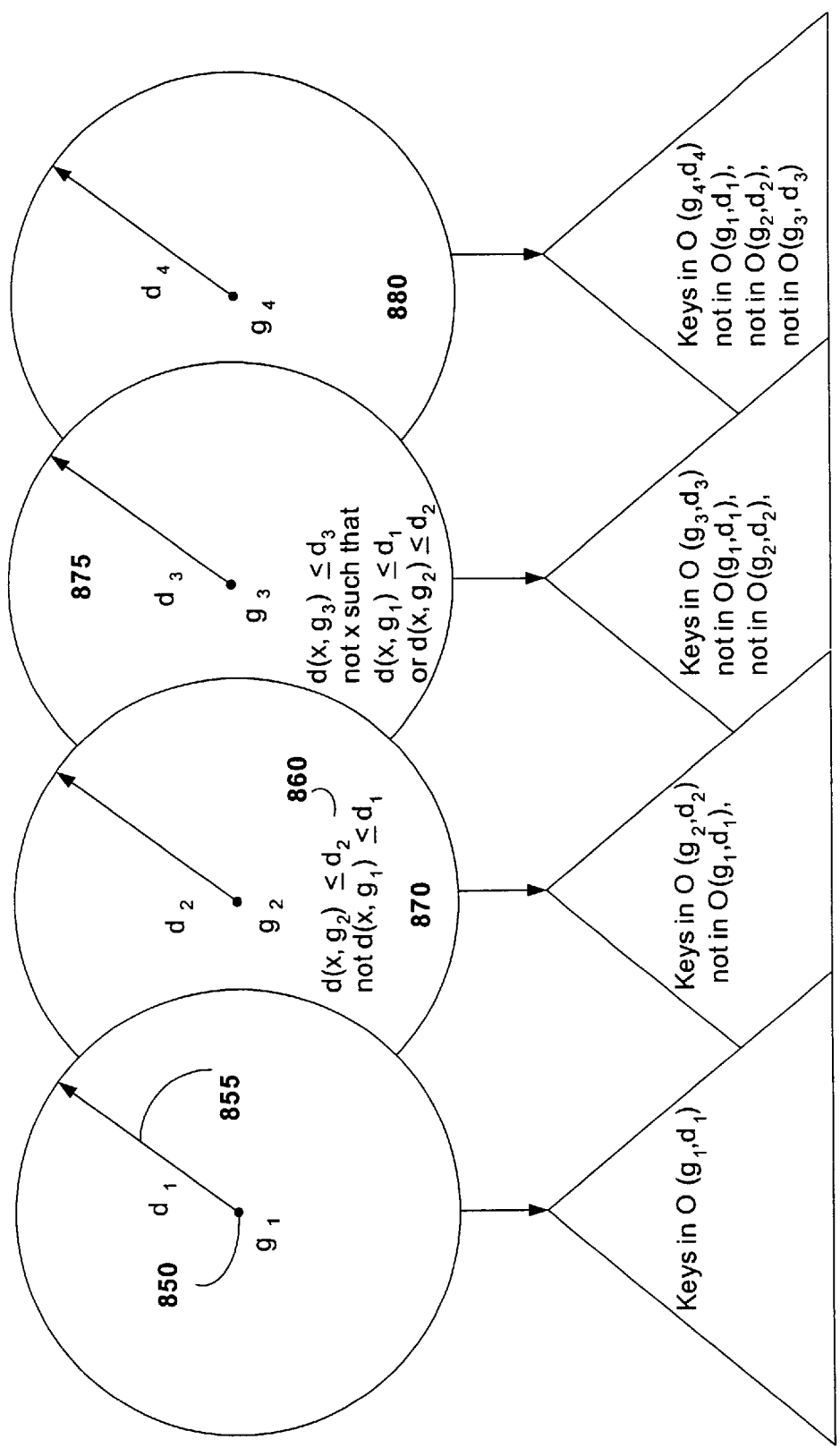

DATA SEARCH EMPLOYING METRIC SPACES, MULTIGRID INDEXES, AND B-GRID TREES

PRIORITY

This application is related to and claims priority under 35 U.S.C. §119(e) to U.S. Provisional Patent Application Serial No. 60/167,045, filed Nov. 23, 1999, entitled "MULTIGRID INDEX SEARCH, AND B-GRID TREE IN METRIC SPACES WITH APLICATIONS TO GENETIC SEQUENCE SEARCH; TEXTUAL DATABASE SEARCH; DICTIONARY LOOKUP; AND GRAPHICAL SEARCH", the contents of which are hereby incorporated by reference in their entirety.

FIELD OF THE INVENTION

This invention generally relates to information processing and management of data. Particularly, the invention relates to efficient searches of data sets using metric spaces, multigrid indexes, and B-grid trees, and, more particularly, to find "hits" for a query of large data sets in a metric space.

BACKGROUND OF THE INVENTION

Advances in computing technologies significantly impact our lives. From simple scheduling to advanced whole genomic analysis, computing and computing applications are at the center of these activities. Among the many facets of computing, data search and management are the most employed and, what some may consider, to be the most critical functions performed. Data search provides quick access to desired data that may be buried in large data sets. As such, search features are extensively employed in data intensive processing applications such as DNA or protein sequence comparisons. A key factor of data searches is efficiency, both time efficiency and computational efficiency.

The search to find an entry in a data set of size N entries, having no specific order, may be extremely time intensive depending on the search system or method that is employed. For example, a simple search on a data set of a million entries without any specific order will generally require one million comparisons. That is, each data element of the data set is processed during the search to provide hits that contain the desired entry. A hit to a query is generally defined as those points that meet the specified neighborhood criteria in the metric space. In the context of efficiency, the search complexity required for a search may be quantified by the order function O( ). Accordingly, the search complexity for this example can be characterized as O(N). Advances in computer/information science, however, have reduced the search complexity to O(log N). Using these advances, the one million comparisons of the above example can be reduced to 20 comparisons in a binary search.

The reduction in search complexity is attributed to the performance of pre-processing. Data pre-processing involves the creation of data indexes prior to search such that the search is performed on the created indexes instead of each data element of the data set. The data can be pre-processed according to a "sort" process, or by developing balanced multiway trees (B-trees). Although the pre-processing of data contributes to an one-time increase in computational complexity of O(NlogN) (i.e. the number of steps required in preparing the data before performing the search), the search complexity is significantly decreased. It is reduced from O(N) to O(log N).

Algorithms to perform the aforementioned pre-processing are known in the art and are described by M. A. Weiss, Data Strucutre and Algorithm Analysis In C++ (Addison-Wesely Publishing Co., 2 edition, 1998); R Sedgewick, Algorithms in C++, (Addison-Wesley Publishing Co., 1992); R. F. Gilberg, B. A. Forouzan, Data Structures, A Pseudocode Approach with C (PWS Publishing Co. 1998); and R. Bayer and E. McCreight, Organization and Maintenance of Large Ordered Indexes, Acta Informatica, Vol. 1, No. 3, pp. 173–189, 1972 which are herein incorporated by reference. Current pre-processing algorithms (e.g. sorting, B-Tree) may be performed in one dimensional data space or in multidimensional space.

As an alternative to sorting in a metric space is to perform k-clustering of the data. A k-clustering of a set N is a partition of the set into k subsets which optimizes some clustering criterion. K-clustering aims to solve the problem that given a weighted graph G=(X, d) on N vertices, where d( . , . ) is the weight function, partition X into k sets $S_1, \ldots, S_k$, such that the value of:

$$\Sigma_i \Sigma_{\{u, v \text{ in } Si\}} d(u, v)$$

is minimized. Some of the algorithms developed are described by S. Sahni, T. Gonzalez, P-Complete Approximation Problems, JACM (23), 1976, pp555–566; N. Garg, V. V. Vazirani, M. Yannakakis, Approximate Max-Flow Min-(Multi)-Cut Theorems and Their Applications. SICOMP (25), 1995, pp235–251; W. F. de la Vega, C. Kenyon, A Randomized Approximation Scheme for Metric MAX_CUT. 1998. FOCS'98, pp468–471; and Piotr Indyk, A Sublinear Time Approximation Scheme For Clustering In Metric Spaces. 1999. FOCS'99, pp154–159 which are herein incorporated by reference. However, k-clustering has not been used to build searchable trees in metric space. As such, a particularly useful data preprocessing method is not being exploited to its fullest potential.

Current sorting algorithms, such as, binary sort, merge sort, or quick sort, arranges the data according to a particular structure (i.e. tree, linked list, or array). By themselves, these algorithms generally provide a fast way of locating an exact item in a data set, however, they do not provide a method of locating "approximate" or "similar" elements to a search query. Several solutions have been developed to accommodate for this drawback. These solutions include hardware solutions to increase the computational efficiency and thereby reduce the search time, and software solutions that employ additional algorithms to the sorting algorithms to quickly "screen" out dissimilar elements. These solutions are described in S. Rosenthan. The PF474 Chip, A Coprocessor for String Comparison. Byte, 1984; U.S. Pat. No. 4,490,811, entitled "String Comparator Device System Circuit and Method"; and Patrick A. V. Hall and Geoff R. Dowling, Approximate String Matching, ACM Computing Surveys, Vol. 12, No. 4, pp381–402, December, 1980; U.S. Pat. No. 5,978,797, entitled "Multistage Intelligent String Comparison Method" which are herein incorporated by reference. However, these solutions can be error prone as certain relevant data elements may be overlooked.

From the foregoing, it can be appreciated that there exists a need for systems and methods to search data sets using metric space that provide exact and more relevant "approximate" search results such that search complexity is significantly reduced. By having these systems and methods the drawbacks of the prior art may be overcome.

SUMMARY OF THE INVENTION

The present invention provides systems and methods to search data sets using a metric-space theoretical approach to solve "approximate" or "inexact" searching problems. In an illustrative implementation, traditional "sorting" processes performed in 1-dimensional space are extended to general metric spaces. In this implementation, a multigrid search tree is generated by calculating distance functions of the data in metric space for the data set desired to be searched. The multigrid tree provides an index for each data element of the data set, such that a submitted search query is compared against the multigrid tree to find exact or "hit" matches, where a "hit" may be defined as an inexact, but close enough match based on some criteria. In an application of the method to genetic sequence search problem, outputs from BLAST and FASTA may be used to calculate local distances between data elements, which can be used to create local multigrid trees to provide very efficient search algorithms to process submitted search queries. In this implementation, the multigrid tree may comprise a balanced multigrid tree (B-grid) such that the data elements of the data set being searched are partitioned in equal size grids ensuring more homogeneous search time thereby reducing computational complexity.

Other aspects of the present invention are described below.

BRIEF DESCRIPTION OF THE DRAWINGS

The systems and methods to search data using metric spaces, B-grid trees, and multigrid indexes, in accordance with the present invention are further described with reference to the accompanying drawings in which:

FIG. 8B is a block diagram of a multidimensional balanced multigrid tree (B-grid tree) in metric space in accordance with the present invention;

DETAILED DESCRIPTION OF PREFERRED EMBODIMENTS

Overview

Figure 1:
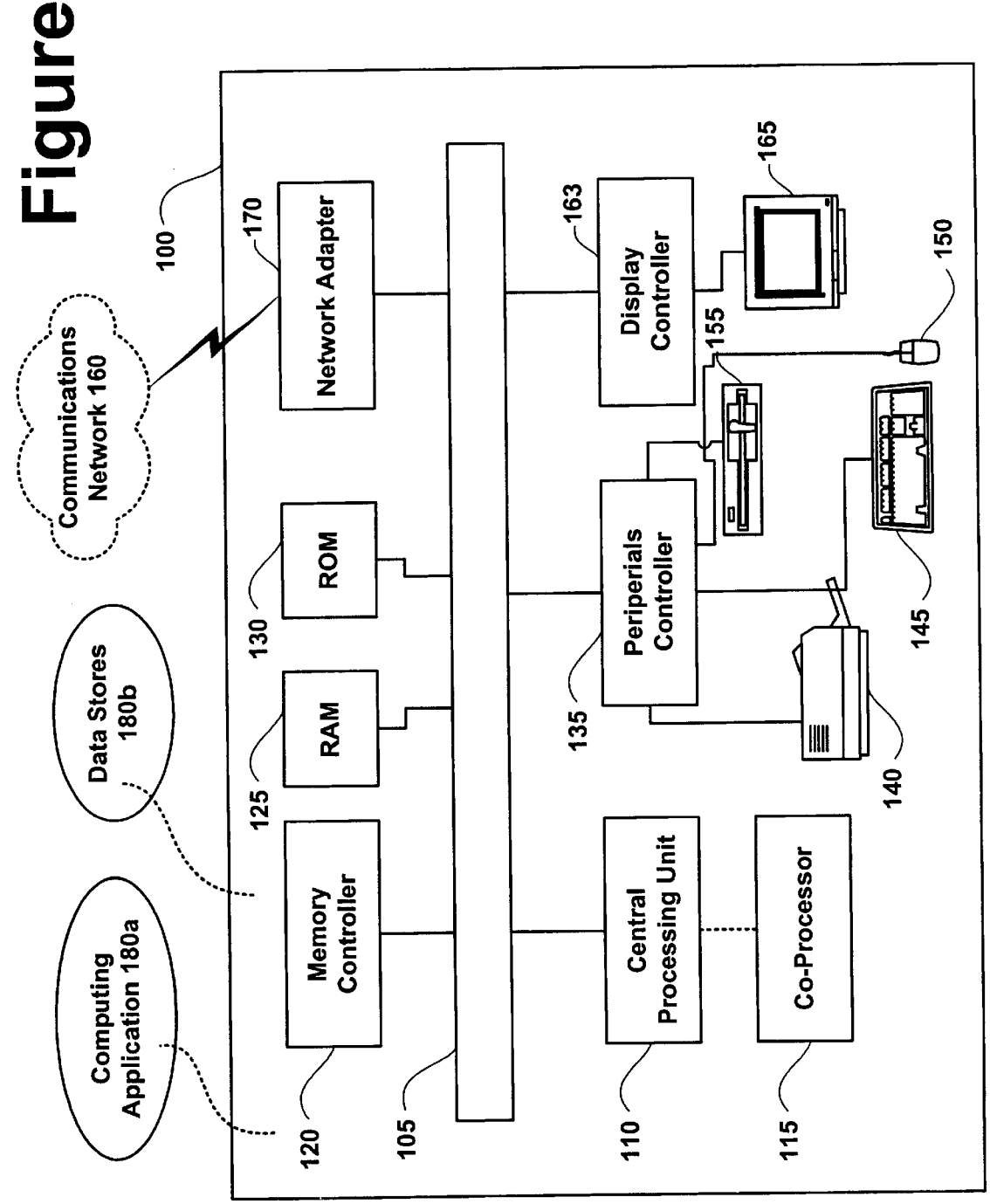
FIG. 1 is a block diagram of an exemplary computing environment in accordance with the present invention.

Data search is a vital component of data management and information sciences. Conventional data searches require each element of a data set to be compared against a submitted search query. This is a time intensive and arduous task that places an extreme burden on valuable computational resources. Advances in search technologies have allowed for more efficient search methods to be performed on data sets. These advances share a commonality, the pre-processing of data to create indexes. Instead of performing comparisons on the data elements themselves, comparisons are performed on the indexes to determine if there exist exact matches between the submitted search query and the data elements of the data set. However, existing pre-processing techniques are limited to one to multidimensional cases, they do not apply to general metric spaces. They cannot be applied to complex searching problems such as finding inexact matches in genetic sequences, or finding related images in a collection of images.

The present invention aims to ameliorate the shortcomings of existing data search methods and systems. The present invention attacks the drawbacks of data search from a different viewpoint. First, a certain metric is designed for the data set that is appropriate for the question at hand. The data is then "sorted" in a special way that is relevant to the metric. The result is this "metric-sorted" list will yield a searching method that can locate all the relevant entries using relatively few comparisons without of loss of any exact matches. In addition, the concepts of the invention may be coupled with current approximate heuristic searching algorithms to achieve an extremely efficient search method. As such, the present invention is adaptable for operation on existing data search systems to provide more relevant results in a more efficient manner.

In operation, the systems and methods of the present invention first process a data set to create a multigrid tree. The multigrid tree comprises grid-points (e.g. a data element in the data space comprising of the data set or, stated differently, a collection of adjacent points in the data space). The multigrid tree is calculated using distance functions of a metric space. Associated with each grid point is a radius that defines the neighborhood of the grid point (i.e., a grid). In an illustrative implementation, the multigrid tree comprises a plurality of descending branches that originate from a root grid point. The further the branch from the root grid point, the smaller the radius of the grid points residing on that branch. The multigrid tree may be a B-grid tree that is balanced such that data elements of the data set are partitioned in equal size grids such that search time is more homogenous for varying search queries.

For example, for a given query point q, inexact matches to q in a given data set can be found. In mathematical terms, the search aims to find all points p in the data set such that those points p satisfy $d(q,p) \leq \epsilon$, where $d(.,.)$ is the distance function in the metric space, and $\epsilon$ is the size of interested neighborhood. When a search started, a comparison is performed among all of the grid points of at the first level of the created B-grid tree. At each level, many subtrees are totally eliminated for further search by applying the triangular inequality rule. For example, suppose the grid points are $g_{ij}$, the comparison search for the desired data elements to satisfy the search string q is only to be further carried out within those grids where $d(q,g_{ij}) < \epsilon + \delta_{ij}$, where $\delta_{ij}$ is the chosen grid size. The systems and methods of the present invention perform these calculations to produce result set for communication to the participating user.

In an alternative implementation, the systems and methods of the present invention are used to calculate local distances for submitted search queries. For example, for a given query q, the search aims to find most of points p where $d(p, q) < \epsilon$, whereas the missed points p are likely close to the boundary of $d(p,q) = \epsilon$. In this implementation, current search algorithms, such as, BLAST and FASTA are used to create a local multigrid tree (or a local B-grid tree) having local distances. Employing the same steps above, the local multigrid tree (or local B-grid) tree is analyzed to find data elements for the submitted search query. Since local distances are used to create the local multigrid tree (or the local B-grid search tree), the result set will contain most of the desired hits for a submitted search query.

The applications of the present invention are far reaching, such as, searching for homologous biological sequences, dictionary lookups, spell check, keyword based literature search, and graphical rendering. In biological homologies sequence searches, a query sequence (string) is compared with sequences in a database using either local or global sequence alignment algorithm. Those alignments show the similarity between the two sequences, and usually a statistical value (p-value) is assigned. Sequence alignment methods for biological sequence comparisons are described by the Needleman-Wunsch global alignment method: S. B. Needleman and C. D. Wunsch, "A General Method Applicable To The Search For Similarities In The Amino Acid Sequence Of Two Proteins", J. Mol. Biol. 48: 443–453 (1970), and the Smith-Waterman local alignment: T. F. Smith and M. S. Waterman, "Identifications Of Common Molecular Subsequences" J. Mol. Biol. 147: 195–197 (1981), which are herein incorporated by reference. These two methods are based on dynamic programming to generate either global or local alignment between two sequences. At a data set level, each method has to compare the query with the whole data set, one sequence at a time. As such, these searches require a time complexity of O(N), a rather time-intensive proposition.

Due to the extremely long time required for a search of a large data set, approximation searh methods have been developed (e.g. FASTA and BLAST). These approximation search methods are similar in spirit to the traditional search algorithms and are generally described in W. R. Pearson, "Rapid And Sensitive Sequence Comparison With FASTP and FASTA, Methods in Enzymology, R. F. Doolittle, Ed. vol 183:63–98. Academic Press, New York; W. R. Pearson, T. Wood, Z. Zhang, and W. Miller, "Comparison of DNA Sequences With Protein Sequences," Genomics 46:24–36 (1997); S. F. Altschul, W. Gish, W. Miller, E. W. Myers, D. Lipman, "Basic Local Alignment Search Tool," J. Mol. Biol. 215: 403–410 (1990); S. F. Altschul, T. L. Madden, A. A. Schaffer, J. Zhang, Z. Zhang, W. Miller, and D. Lipman, "Gapped BLAST and PSI-BLAST: A New Generation Of Protein Database Search Programs," Nucleic Acids Research 25:3389–3402 (1997); U.S. Pat. No. 5,701,256, entitled "Method and Apparatus For Biological Sequence Comparison," which are herein incorporated by reference.

When comparing efficiencies, FASTA is faster than Smith-Waterman in the 1-1 alignment stage because it approximates dynamic programming by using a fast k-tuple lookup procedure between two sequences. BLAST carries this approximation one step further, by first filtering the whole database to eliminate those unlikely candidates. The improvements are in the form of "pre-screening" or "filtering" where the majority of the database sequences are "filtered" out via some heuristic arguments. Here, speed is paramount even at the risk of loss of certain distant element matches. However, even with the approximations, pre-screening methods still maintain a computational complexity of O(N). As such, the reduction in search time is linear at best. Accordingly, as the data set increases in size, the searching time keeps increasing linearly.

The present invention provides a coherent, efficient data search systems and methods that can be applied to biological sequence data to find exact matches such that the time complexity is reduced from O(N) to O(logN) and can also be utilized to provide approximate search results (i.e. consistent with the FASTA and BLAST search methods) much more efficiently than current counterpart data search techniques. When applied to biological sequence data, the present invention provides an extremely efficient method for categorizing/indexing this data and a quick search of the categorized/indexed data. Generally, there are five ways to compare a query sequence against a database for genetic applications: 1) DNA vs. DNA (i.e. compare DNA sequences directly), 2) protein vs. protein (i.e. compare amino-acid sequences directly), 3) DNA vs. protein (i.e. compare 6-frame translation of the DNA sequence vs. the protein data set), 4) protein vs. DNA (i.e. translate the DNA data set in 6 frames and compare with the protein sequence), and 5) DNA vs. DNA II (i.e. compare 6-frame-translation of the DNA sequence vs. the 6-frame translation of the DNA data set). A 6-frame translation is a method by which a DNA sequence may be identified with a protein sequence.

The gene data may be stored in a data set such that searches are performed on the data in accordance with the present invention and following the above search queries for biological sequences. The search encompasses the steps of creating a B-grid tree of the genomic data using distance functions of a metric space. A comparison is then performed between the submitted search and the B-grid tree to identify homologous matches, or alternatively, a comparison may be performed between the submitted query and a local B-grid tree to provide homologous matches. A local B-grid tree is created using approximate data sorting algorithms (e.g. FASTA and BLAST). Once the invention is used to measure the evolutionary distances between 2 full-length genes, the method for general cases can be applied without too much difficulty. The distance function of the metric space is based on the global alignment of Needleman-Wunsch algorithm. The generation of the B-grid tree can be performed in large bioinformatic centers and distributed together with standard releases of biological sequence data sets.

The Needleman-Wunsch alignment is an expensive operation even on small scales. A solution to this drawback is to perform fragmented searches of the biological sequence data. That is, the sequences may be fragmented, that the required search alignment may be performed by local (i.e. non-global) alignment algorithms, such as the Smith-Waterman, FASTA and BLAST. Instead of calculating an exact distance between the data elements, a "approximate distance", i.e, local distance, is calculated, with the risk of loss of some marginal hits. As such, long sequences can be chopped into overlapping segments of equal sizes. The distances between two segments can be approximated by extrapolation from local alignment statistics as shown below.

Alternatively, the present invention may be employed in word processing computing application. In these applications a spell check program (i.e. spell checker) is often used to check the spelling of the words in a document. A spell checker has an associated dictionary file that contains a list of correctly spelled words. To check the spelling of a word in the document, the spell checker searches the dictionary for that word. If the word is in the dictionary, then the word is correctly spelled. Otherwise, the word is misspelled. The spell checker typically reports the misspelling to the user and prompts for the correct spelling. The spell checker then replaces the misspelled word with the correctly spelled word.

In current spell checkers, a linear comparison is employed such that a query word is compared with every word in the dictionary. This type of processing is described in U.S. Pat. No. 5,276,741, entitled "Fuzzy String Matcher," U.S. Pat. No. 4,136,395, "System For Automatically Proofreading A Document," U.S. Pat. No. 4,689,768, "Spelling Verification System With Immediate Operator Alerts To Non-matches Between Inputted Words And Words Stored In Plural Dictionary Memories," U.S. Pat. No. 5,765,180, "Method and System For Correcting The Spelling Of Misspelled Words," which are herein incorporated by reference.

The present invention provides a more efficient method of identifying misspelled words. First structured-tree for the whole word dictionary is created. As such, the search for a particular word in the dictionary is optimized since a search is performed on the structured tree as opposed to each word in the dictionary. Additionally, the present invention may be used by the spell checker to return suggested correct spellings of similar words even if the searched word is not in the dictionary. As such, valuable computing resources are saved for use in other processing.

The present invention may also be employed to perform keyword searches on large volumes of literature data. The literature data is transposed to a metric space such that the distance function is defined as linear function of shared keywords. In operation, a keyword is provided to the search system and method, using the newly defined distance function, the search will aim to find occurrences of the submitted keyword (or keywords) in the literature data set and report those literature data elements that have share occurrences.

In an illustrative implementation, described more fully hereinafter, the systems and methods of the present invention may be implemented as part of a computing application. Although the depicted embodiment provides systems and methods employing exemplary computing devices having a particular configuration, those skilled in the art will appreciate that the inventive concepts described herein extend to various types of computing devices having varying configurations.

Illustrative Computing Environment

FIG. 1 depicts an exemplary computing system 100 in accordance with the invention. Computing system 100 is capable of executing an exemplary data search computing application 180a that allows users to perform data searches on data sets. Computing application 180a cooperates with data store 180b where the data sets that are searched are stored. Data store may comprise a sequential database, a relational database, a flat file. Exemplary computing system 100 is controlled primarily by computer readable instructions, which may be in the form of software, wherever, or by whatever means such software is stored or accessed. Such software may be executed within central processing unit (CPU) 110 to cause data processing system 100 to do work. In many known workstations and personal computers central processing unit 110 is implemented by a single-chip CPU called a microprocessor. Coprocessor 115 is an optional processor, distinct from main CPU 110, that performs additional functions or assists CPU 110. One common type of coprocessor is the floating-point coprocessor, also called a numeric or math coprocessor, which is designed to perform numeric calculations faster and better than general-purpose CPU 110. Recently, however, the functions of many coprocessors have been incorporated into more powerful single-chip microprocessors.

In operation, CPU 110 fetches, decodes, and executes instructions, and transfers information to and from other resources via the computer's main data-transfer path, system bus 105. Such a system bus connects the components in computing system 100 and defines the medium for data exchange. System bus 105 typically includes data lines for sending data, address lines for sending addresses, and control lines for sending interrupts and for operating the system bus. An example of such a system bus is the PCI (Peripheral Component Interconnect) bus. Some of today's advanced busses provide a function called bus arbitration that regulates access to the bus by extension cards, controllers, and CPU 110. Devices that attach to these busses and arbitrate to take over the bus are called bus masters. Bus master support also allows multiprocessor configurations of the busses to be created by the addition of bus master adapters containing a processor and its support chips.

Memory devices coupled to system bus 105 include random access memory (RAM) 125 and read only memory (ROM) 130. Such memories include circuitry that allows information to be stored and retrieved. ROMs 130 generally contain stored data that cannot be modified. Data stored in RAM 125 can be read or changed by CPU 110 or other hardware devices. Access to RAM 125 and/or ROM 130 may be controlled by memory controller 120. Memory controller 120 may provide an address translation function that translates virtual addresses into physical addresses as instructions are executed. Memory controller 120 may also provide a memory protection function that isolates processes within the system and isolates system processes from user processes. Thus, a program running in user mode can access only memory mapped by its own process virtual address space; it cannot access memory within another process's virtual address space unless memory sharing between the processes has been set up.

In addition, computing system 100 may contain peripherals controller 135 responsible for communicating instructions from CPU 110 to peripherals, such as, printer 140, keyboard 145, mouse 150, and disk drive 155.

Display 165, which is controlled by display controller 160, is used to display visual output generated by computing system 100. Such visual output may include text, graphics, animated graphics, and video. Display 165 may be implemented with a CRT-based video display, an LCD-based flat-panel display, gas plasma-based flat-panel display, or a touch-panel. Display controller 163 includes electronic components required to generate a video signal that is sent to display 165.

Further, computing system 100 may contain network adaptor 90 which may be used to connect computing system 100 to an external communication network 160. Communications network 160 may provide computer users with means of communicating and transferring software and information electronically. Additionally, communications network 160 may provide distributed processing, which involves several computers and the sharing of workloads or cooperative efforts in performing a task. It will be appreciated that the network connections shown are exemplary and other means of establishing a communications link between the computers may be used.

Illustrative Computer Network Environment

Figure 2:
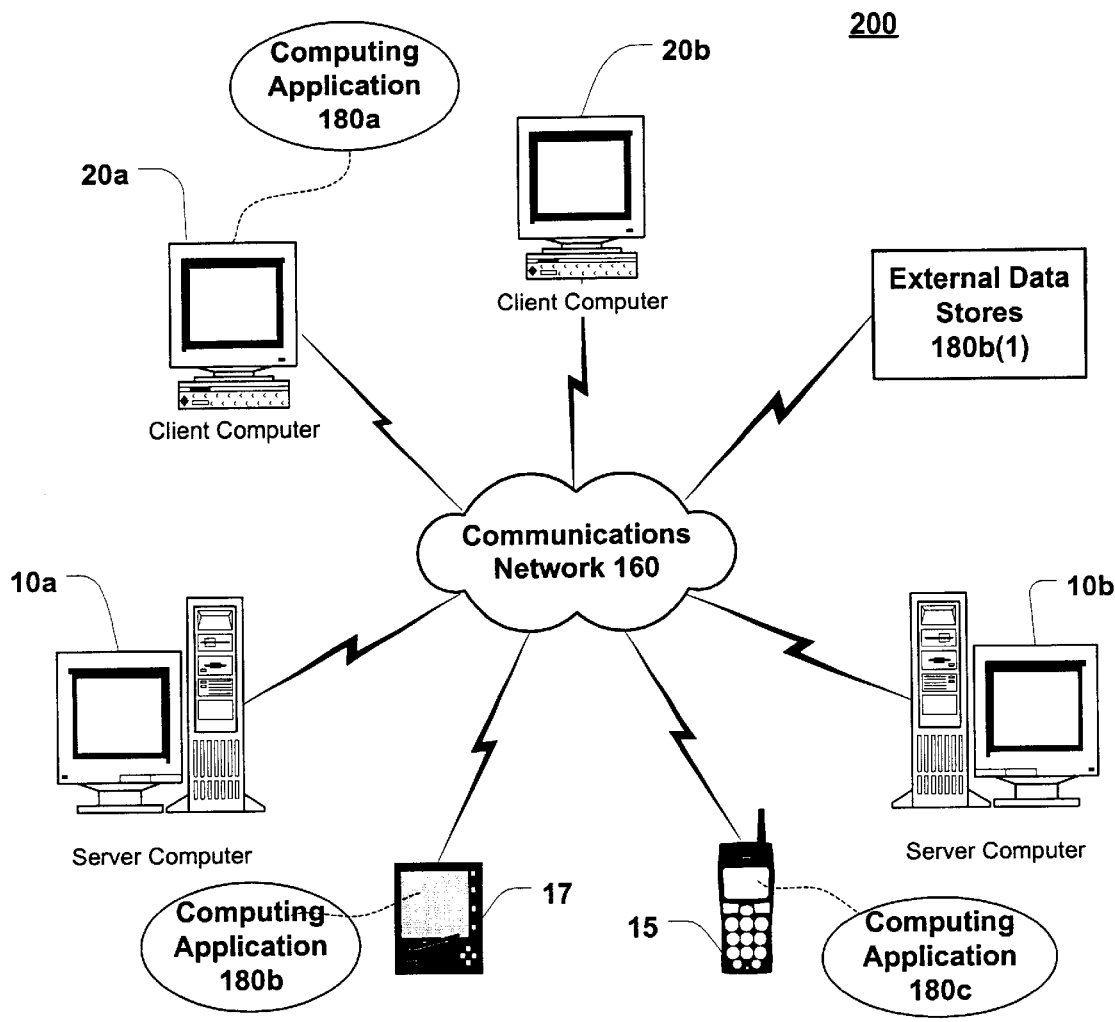
FIG. 2 is a block diagram of an exemplary computing network environment in accordance with the present invention.

As noted above, the computer described with respect to FIG. 1 can be deployed as part of a computer network. In general, the above description applies to both server computers and client computers deployed in a network environment. FIG. 2 illustrates an exemplary network environment, with a server computer 10a, 10b in communication with client computers 20a and 20b via a communications network 160, in which the present invention may be employed. As shown in FIG. 2, a number of servers 10a, 10b, etc., are interconnected via a communications network 160 (which may be a LAN, WAN, intranet or the Internet) with a number of client computers 20a and 20b, or computing devices, such as, mobile phone 15 and personal digital assistant 17, and various external data stores 180b(1) (databases, flat files, storage area networks (SANs), or peer-to-peer (e.g. distributive computing) data stores). In a network environment in which the communications network 160 is the Internet, for example, the servers 10 can be Web servers with which the clients 20 communicate via any of a number of known protocols, such as, hypertext transfer protocol (HTTP) or wireless application protocol (WAP), as well as other innovative communication protocols. Each client computer 20 can be equipped with computing application 180a to gain access to the servers 10. Similarly, personal digital assistant 17 can be equipped with computing application 180b and mobile phone 15 can be equipped with computing application 180c to display and receive various data.

Thus, the present invention can be utilized in a computer network environment having client computing devices for accessing and interacting with the network and a server computer for interacting with client computers, and data stores interacting with the client and server computers. However, the systems and methods for providing adaptable rendering of data of the present invention can be implemented with a variety of network-based architectures, and thus should not be limited to the example shown. The present invention will now be described in more detail with reference to a presently illustrative implementation.

In an illustrative implementation, a computing application may operate on client computing devices that offers a search feature for data stored in a data store that cooperates with the computing application. A search query may be submitted to the data store via the computing application to find data elements that match or are approximate to the submitted search query. In return, the data store operating may perform searches in accordance with the invention to provide exact or approximate matches for data elements to satisfy the submitted query.

Data Search Using Metric Space, Multigrid Indexes, and B-Grid Trees

A metric space is generally defined as a object set together with a rule called a distance function. The distance function relates a number to every pair of objects from the set such that the correspondence has properties similar to those of distance in Euclidean space. That is, the distance function $d(x,y)$ is always positive and satisfies the triangle inequality (i.e. the length of any side of a triangle is less than the sum of the other two sides) for any three points. Stated differently, for a set E, a distance on a set E is a function such that:
1) $d(x,y)=0$ if and only if $x=y$, else: $d(x,y)>0$.
2) $d(x,y)=d(y,x)$ for all $x,y \in E$ (d is symmetric).
3) $d(x,y) \leq d(x,z)+d(y,z)$ for all $x, y, z \in E$.

This third condition is known as the triangle inequality. For example, a distance function can be defined between 2 textual strings as the cost of transforming 1 to the other. For purposes of the example provided, admissible transforming operations are as follows:

Substitution of a character "a" by another "b".
Insertion or deletion of an arbitrary character.

A cost measure (matrix C) can be assigned to track each operation, such as, $c\_\{a,b\}$ is the cost for transforming a to b, and $c\_\{b\}$ is the cost of inserting a b at any position. If each operation is denoted as $Op_i$, then the distance between 2 strings $d(x,y)$ can be defined as:

$$d(x,y)=\min_{S(x,y)} \text{cost}(Op_i)$$

where $S(x,y)$ is the set of all series of operations transforming x into y. The above restrictions (as part of the distance function definition) are required to be placed on C in order to make $d(x,y)$ a distance.

Figure 3:
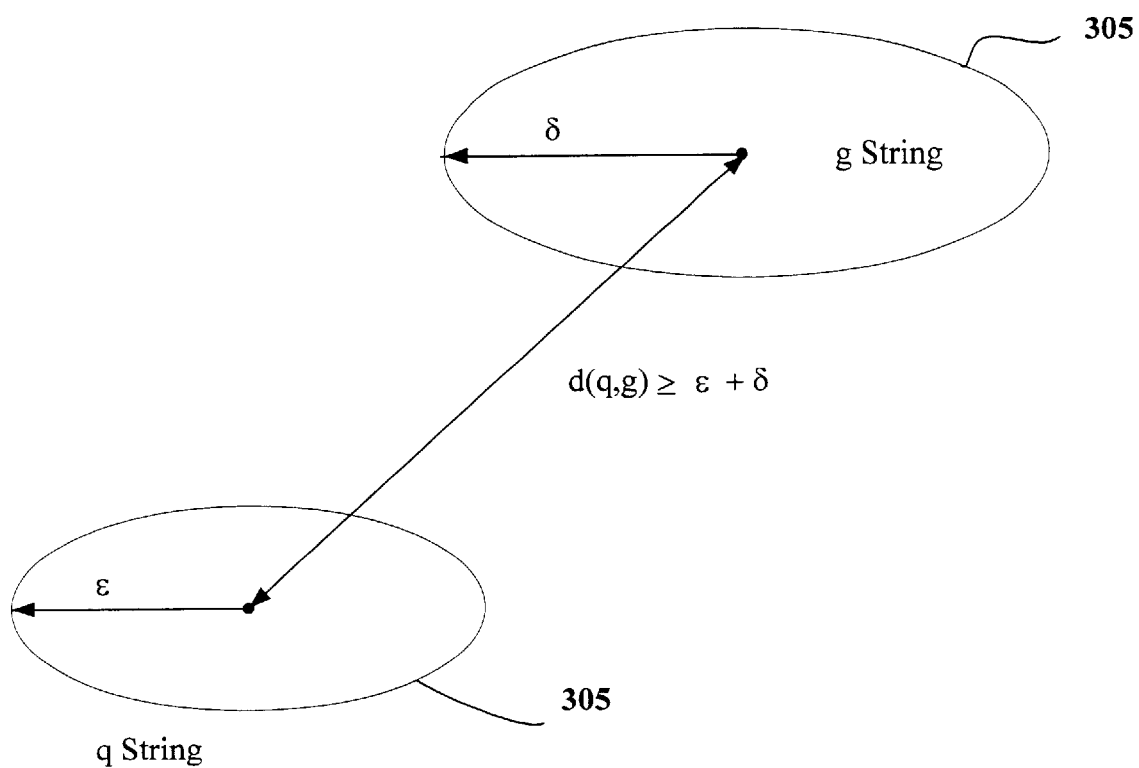
FIG. 3 is a block diagram showing the application of the triangle inequality that excludes further searches in a neighborhood of a metric space after a single distance calculation in accordance with the present invention.

A set in metric space may contain data elements residing in overlapping neighborhoods. Once a distance function is defined between two points, the triangle inequality may be used to quickly eliminate neighborhoods containing non-relevant points during a data search. FIG. 3 shows one key application of the "triangle inequality" in a metric space. Suppose the database is composed of string text. We are given a question: Given a query string "q" 300, find any string "x" satisfying $d(q,x)<\epsilon$? ($\epsilon$ is the radius defining the neighborhood for q). In the example show in FIG. 3, the query string "q" 300 is compared to an arbitrary string g 305. In this scenario, the data set to be searched is $O(g,\delta)$ where g string 305 is a portion of the database string, and $\delta$ is a positive number that represents the neighborhood of g string 305. Using the triangle inequality defined above (i.e. $d(q,g) \leq d(q,z)+d(g,z)$ for all q, g, $z \in O$, where z is arbitrary point in O), if $d(q,g)>\epsilon+\delta$ (i.e. the distance between points in "q" and "g" are greater than the sum of the sizes of the neighborhoods $\epsilon$ and $\delta$), a conclusion can be drawn that there is no common data elements between $O(g,\delta)$ and $O(q,\epsilon)$. Thus, one distance calculation for the neighborhood, $O(g,\delta)$ is sufficient and search processing can proceed to another neighborhood to determine if there are any common data elements between the query neighborhood and the newly observed neighborhood.

The above application of the triangle inequality can be extended to the whole space E. We can subdivide the whole space into many small sections called grids. A grid is defined as:

A collection of adjacent points in E.
It can be described by a grid point "g", and a circle of radius "d", i.e.: Grid "g"={p, where all p satisfying $d(p,g)<\delta$, or, $O(g,\delta)$}.
The grid point may or not be part of the data set being searched.

Thus, a grid-point "g" is defined as the chosen points to represent the grid. The grid is defined as $O(g,\delta)$, where $\delta$ is its radius.

Figure 4:
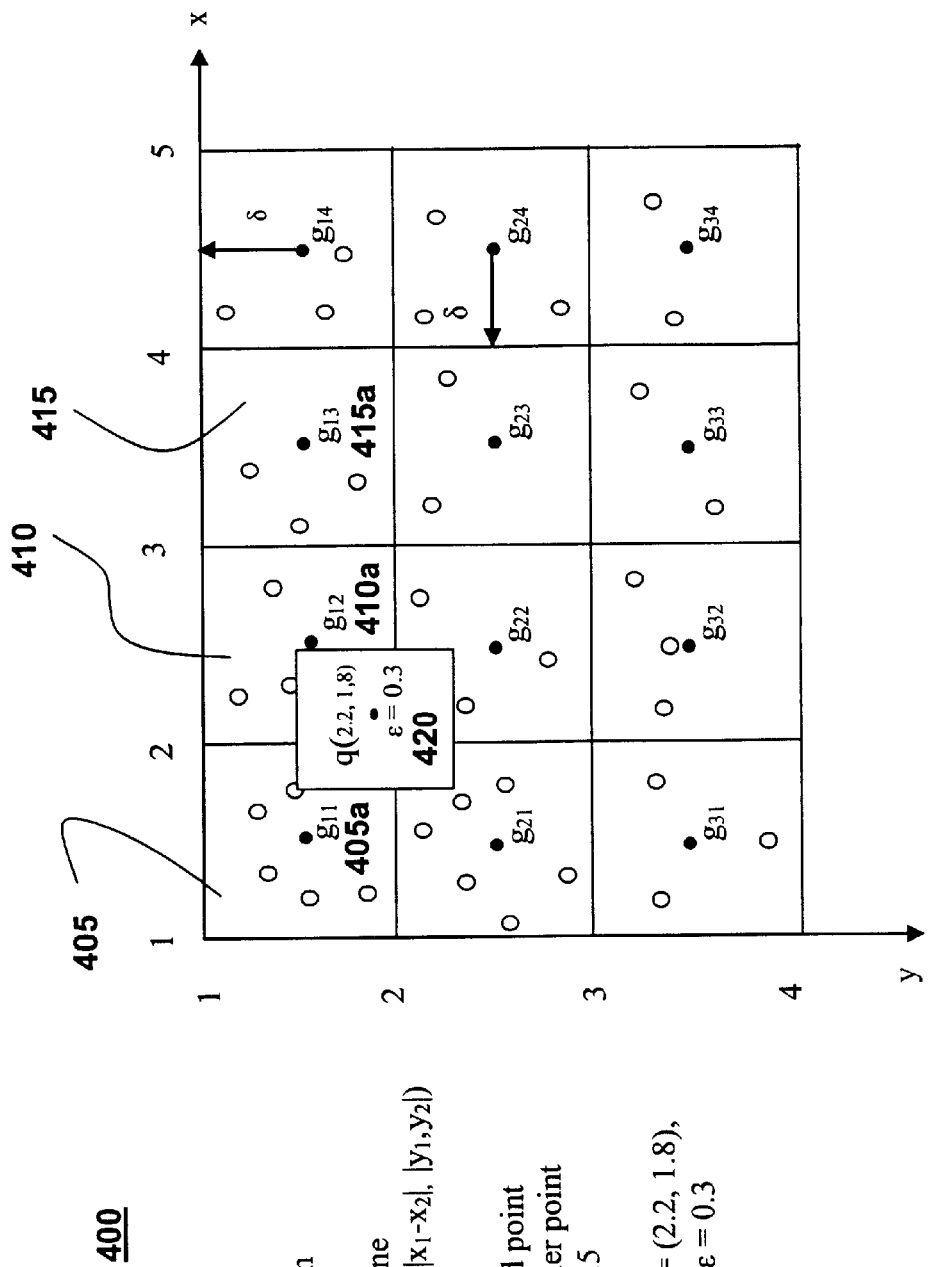
FIG. 4 is a block diagram showing 1-layer grids in a 2-dimensional point set with $L_1$-distance the corresponding search performed in accordance with the present invention.

As shown in FIG. 4, metric space "E" 400 can be divided into many small grids 405, 410, 415, etc., each containing a grid point, 405a, 410a, 415a, etc, respectively. FIG. 4 shows an example of a multi-grid in a 2-dimensional point set with $L_1$-distance and a corresponding search performed on the grid. For example, consider a set of points E, all which are located in a 2-dimensional area of $[1,5]*[1,4]$. The $L_1$-distance may be defined as follows, given $p_1=(x_1,y_1)$, $p_2=(x_2,y_2)$, $d(p_1,p_2)=\max(|x_1-x_2|,|y_1-y_2|)$. Using this calculated distance, an exemplary search may be performed to answer the question: given a query point $q=(2.2, 1.8)$, find out all points p within the area that satisfy $d(q,p)<0.3$.

To solve this problem, a set of grid points $g_{11}=(1.5,1.5)$, $g_{12}=(1.5,2.5)$, ... with a radius of 0.5 are first chosen for searching. These grid points may be not part of the metric space E. Applying the "triangle inequality" rule of FIG. 3, query "q" 420 may be compared with all of the grid points such that non-relevant neighborhoods are eliminated from the search and to produce a result set containing only relevant grids. The result set shows that search query "q" 420 is a subset of grids: $g_{11}$, $g_{12}$, $g_{21}$, $g_{22}$ of metric space E. As such, and as shown in the example, the search is reduced from comparing the search query "q" with all shown neighborhoods (grids) to comparing "q" with only four grids, a significant increase in efficiency.

Figure 5:
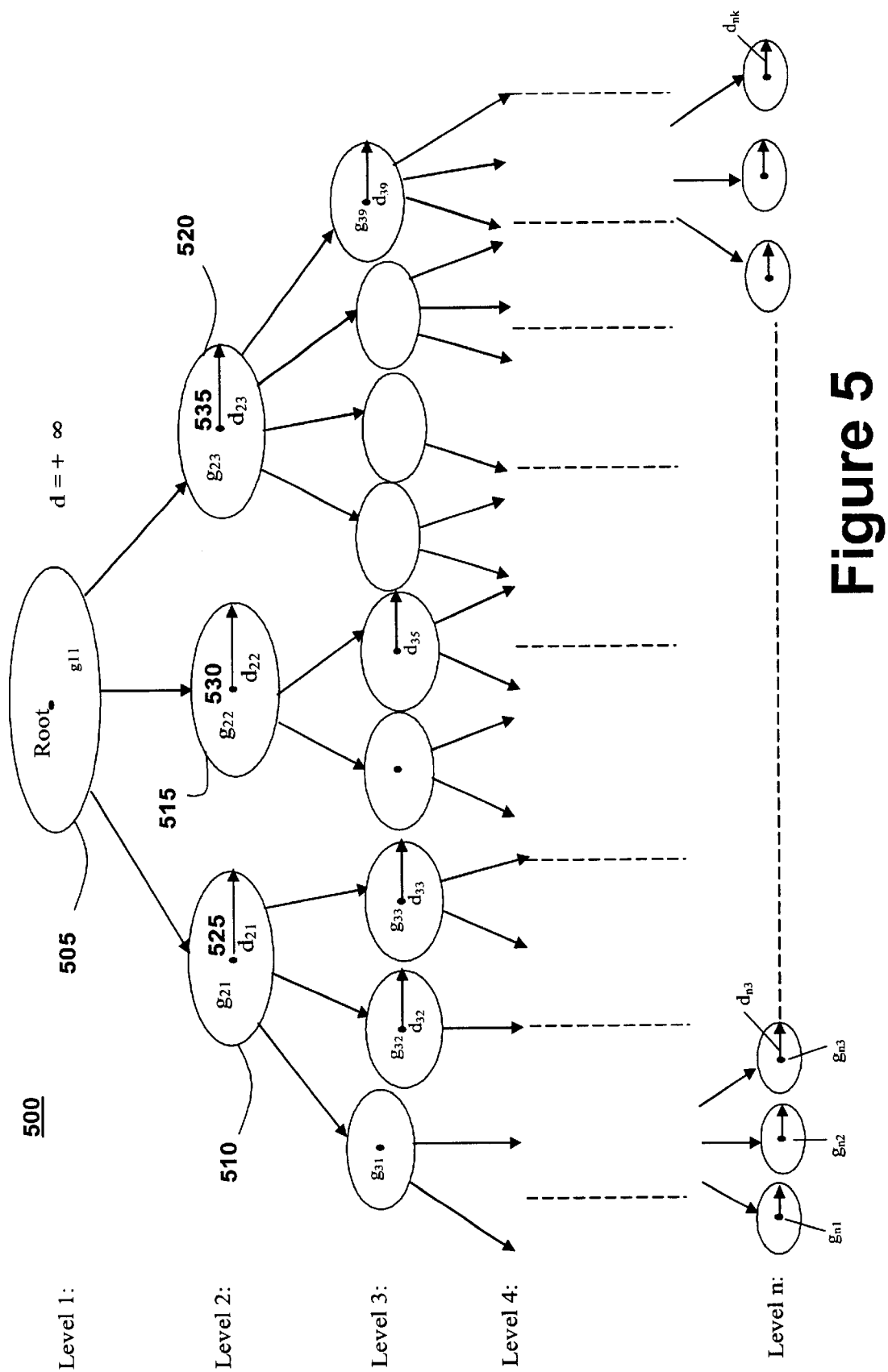
FIG. 5 is a block diagram of multigrid search tree of decreasing radius size in accordance with the present invention.

The grid concept can be extended one more step such that there are multiple levels of grids. Each grid at a fixed level can be subdivided into smaller grids with smaller radius (i.e. a smaller neighborhood). Those smaller grids become children, and the original grid with its grid-point is the parent. In this way, multiple levels of grids can be linked via parent-child relationships. As illustrated in FIG. 5, the multi-layered grid structure when assembled forms a grid search tree.

FIG. 5 shows an example of a multigrid search tree 500 of decreasing radius sizes. At the root (i.e. level-1) of the tree is a root grid, $g_{11}$ 505 with a radius, say, infinite, to cover all the points within a given metric space. As shown, at level-2, there are 3 grids with grid points $g_{21}$ (510), $g_{22}$ (515), $g_{23}$ (520), and radii $d_{21}$ (525), $d_{22}$ (530), $d_{23}$ (535), correspondingly. The multigrid tree extends and sprawls down to level-n where the radius size of each grid approaches zero. Although not depicted, given the definitions of the grids, there may be situations where one or more neighborhoods residing on the same level overlap. Overlapping grids may be problematic when performing the search process. As described previously, neighborhoods are eliminated rather swiftly during the search process by performing a single distance function calculation to verify the triangle inequality between two neighborhoods. If grids were allowed to overlap in the multigrid tree, additional calculations would be required, reducing search efficiency and draining valuable computational resources. To avoid overlapping grids, grids along the same level can be exclusively defined by imposing certain limitations. For example, in the FIG. 3, grids are exclusive if the following conditions are met:

grid_$g_{21}$=$O(g_{21},d_{21})$;

grid_$g_{22}$=$O(g_{22},d_{22})$, and not in $O(g_{21},d_{21})$;

grid_$g_{23}$=$O(g_{23},d_{23})$, not in $O(g_{21},d_{21})$ nor in $O(g_{22},d_{22})$.

As grid levels get deeper, the radius for each grid decreases, so does the number of points within each grid. As a result, the multi-grid tree may become unbalanced (i.e. unequal grid sizes), the neighborhoods $O(g_{nj},d_{nj})$ at a level "n" may overlap, the radii for the grids at a given level may be different from one another, and the grid point may be chosen within or outside of the observed data set E. Those are all conditions which can decrease the performance of a search algorithm, although the searching method based on the above-developed grids will still be much better than the current state-of-art methods.

Figure 6:
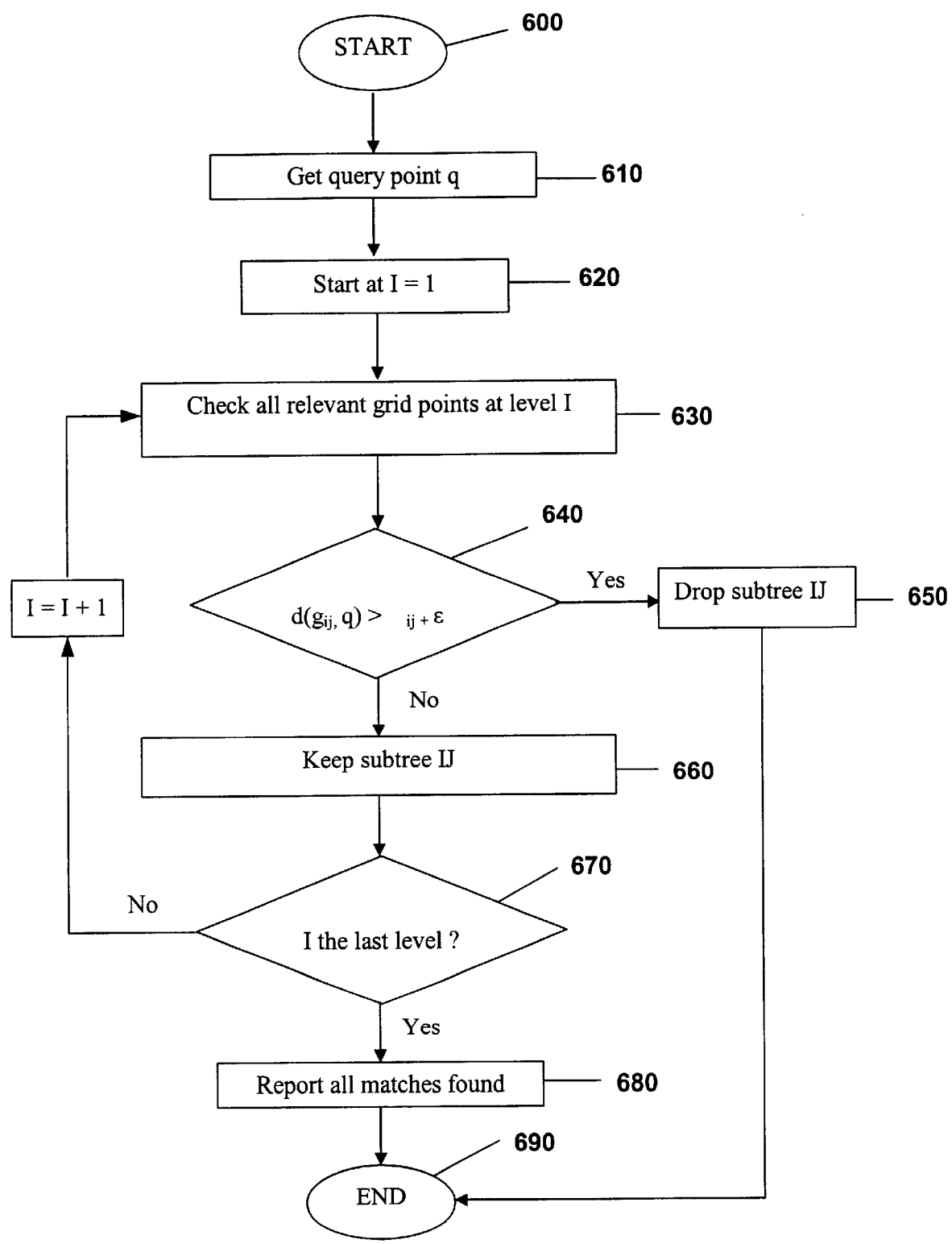
FIG. 6 is a flow diagram of the processing performed when searching a multigrid search tree in accordance with the present invention.

Once created, the multigrid tree can be searched to find exact or approximate or homologous matches for a search query. The multigrid tree can be searched to provide a solution to the following example. Suppose a multigrid search tree representing a set E in a metric space, and a query point in the metric space is provided. The task to find all the points p (exact matches) in E such that $d(q,p)<=\epsilon$. If $\epsilon=0$ may be accomplished by the following. FIG. 6 shows the processing performed to find "exact" or "inexact" matches within a multigrid search tree. The search routine starts at block 600 from the root grids. The search query is then obtained at block 610. The search then begins at level "I" having the list of grids ($g_{il}$, ... ,$g_{ik}$) left to search at block 620. For each grid point along level "I", a check is then made at block 630 to ascertain all of the grid points of all the subtrees of ($g_{il}$, ... ,$g_{ik}$). This check is realized by a comparison of the children grid points with the query. A decision is then performed at block 640 using the triangle inequality to discard any children that is no longer of interest (i.e. a check to see if the subtree grid point satisfies the equation $d(g_{ij},q)>\delta_{ij}+\epsilon$). If the analyzed grid point of the child (i.e. subtree) does not satisfy the inequality, the subtree is dropped from the search at block 650 and processing ends at block 690. If, however, the alternative proves to be true, processing proceeds from block 640 to block 660 where the subtree is kept as part of the search. Processing then proceeds to block 670 where a check is performed to determine if the currently analyzed level is the last level of the multigrid tree. If it is the last level, processing proceeds to block 680 where all of the matches for the search query are reported. Processing then terminates at block 690. If, however, the check at block 670 proves that the currently analyzed multigrid tree level is not the last level of the multigrid tree, processing reverts to block 630 and proceeds therefrom.

As mentioned, a key requirement for an effective and efficient search tree is that the tree should be balanced, that is, the distribution of grid points in each subtree should be uniform. In 1-dimensional cases, this search tree balancing can be realized in several ways, such as, developing a binary AVL-tree or, alternatively, creating a balanced heap. Of importance is the B-tree, or a balanced multiway tree, as it can be easily extended to data in metric spaces. In a metric space E, a balanced multigrid tree, or B-grid tree, of order M, may be defined to be a multiple layered search tree satisfying the following rules. For simplicity and purposes of the following example, M is assumed to be an even integer. Accordingly, to create a B-grid tree the following conditions are met:

1. The root is either a leaf or it has 2 ... M subtrees.
2. All internal nodes (grids) have at least M/2 non-null subtrees and at most M non-null subtrees.
3. All leaf nodes (grids) are at the same level.
4. A leaf node (grid) has at least M/2 and at the most M entries.

Figure 7:
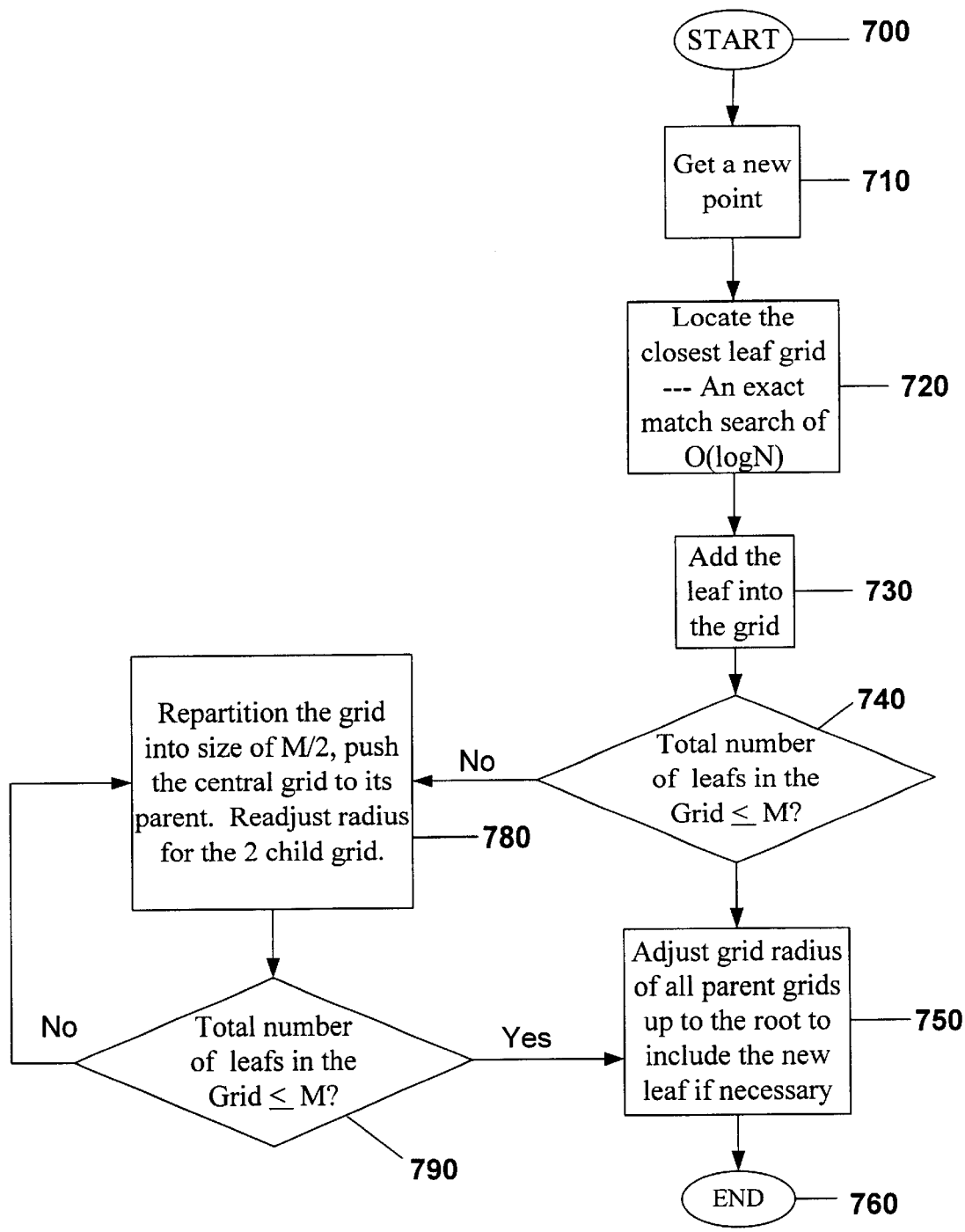
FIG. 7 is a flow diagram for developing a B-grid tree in a metric space in accordance with the present invention.

FIG. 7 shows a flow diagram of the processing performed to add an entry to an existing B-grid tree in a metric space. Processing begins at block 700 and proceeds to block 710 where a new entry "p" is obtained. The closest leaf grid (i.e. last grid containing M/2 ... M leafs) is located at block 720. This process is realized by performing a comparison of the new entry "p" with the grid points to find an exact matching neighborhood. The leaf is then added to the tree at the appropriate level at block 730. A check is then made at block 740 to determine if the total number of points in the B-grid tree grid after the addition of "p" is $\leq M$. If the total number of points in the B-grid tree grid is $\leq M$, the radius of this modified grid is readjusted to accommodate the newest member at block 750. In addition, at block 750, the tree is traversed towards the root readjusting the radius at each parent level to accommodate the addition of this new member. This upward traversal of the tree is a O(logN) operation, requiring few computations. Processing then terminates at block 770.

However, if at block 740, the total number of leafs in the grid are $\geq M$, processing proceeds to block 780 where the grid is repartitioned into 2 size M/2 subgrids (using a clustering or a partitioning algorithm). In addition, at block 780 the radius for each repartitioned subgrids is readjusted such that the two newly formed subgrids are mutually exclusive. Thus, if the neighborhood defined by $O(g_{ij},d_{ij})$ overlaps between the two subgrids, we can assign the grids in the overlapped region into one of the grids but not the other. A check is then made at block 790 to determine if the total number of leafs in the grid is now $\leq M$. If affirmative, processing proceeds to block 760 and therefrom. Otherwise, processing reverts to block 770, until the root grids are partitioned, or another layer of root with only 2 grids is generated.

The B-grid tree provides several advantages including the search tree is a balanced tree, thus the search complexity for this tree for exact matches will be O(logN), and the search tree requires only O(NlogN) steps to develop.

Similar to B-grid tree insertion, points may be deleted from the B-grid tree. The following steps may be performed to realize this scenario. First, the point and the grid it belongs to are located. This process takes O(logN) computations, since this is an exact match problem. Second, delete the point if it is a leaf and balance the remaining points within the parent grid if necessary. As part of balancing the remaining points, it may be necessary to adjust the radius of the grid. However, if the point is not a leaf, or a parent grid becomes unbalanced after the second step, the grid must be balanced. This may be accomplished by readjusting the radii of corresponding grids if necessary. This process is repeated as the unbalanced grid is moved toward the root grid.

Figure 8A:
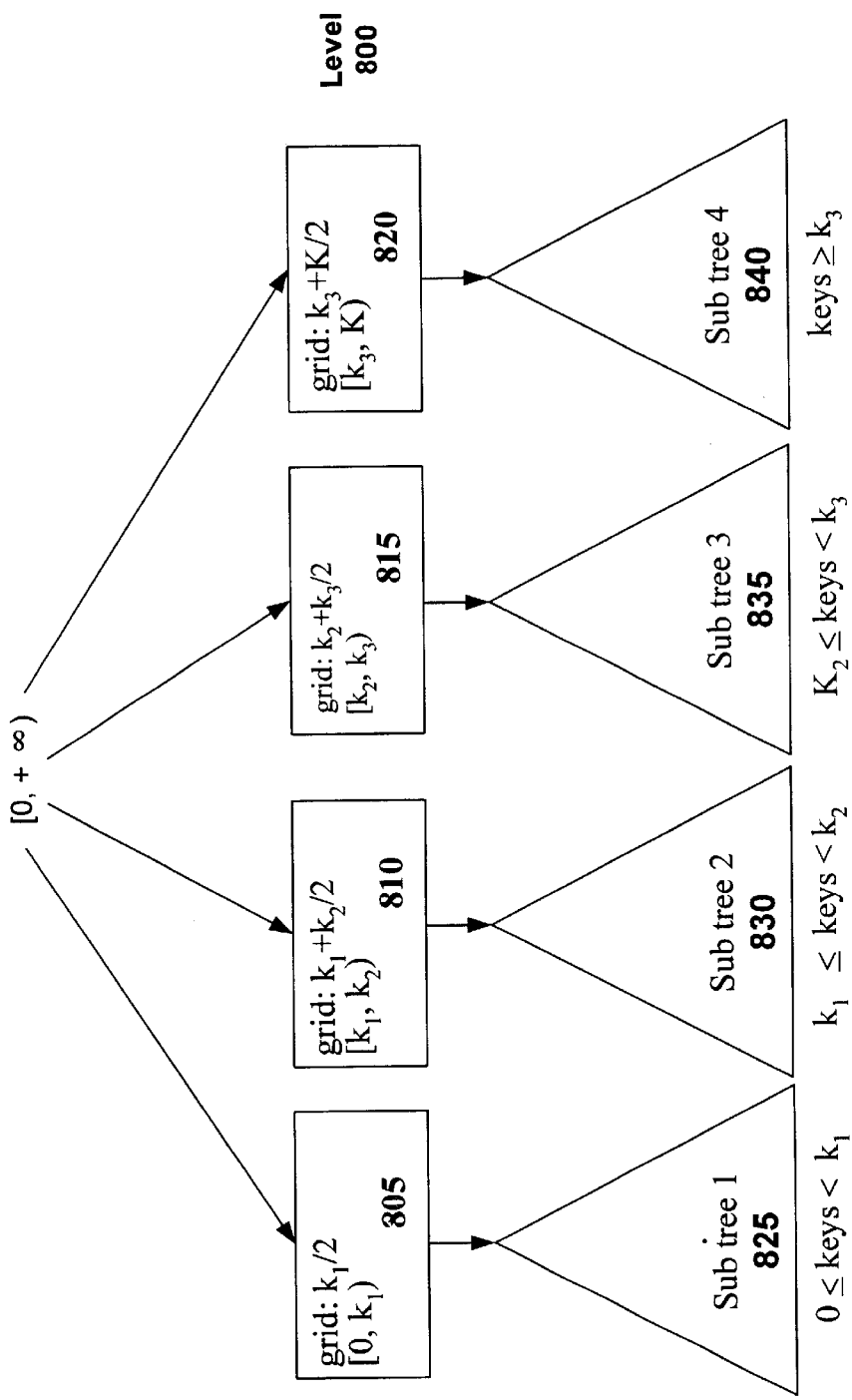
FIG. 8A is a block diagram of a 1-dimensional balanced multigrid tree (B-grid tree) in metric space in accordance with the present invention.

FIG. 8A shows an exemplary 1-dimensional B-grid tree having an order of 4 (i.e. M=4) is given. The space is composed of positive numbers, [0, K), with distance defined as: $d(x_1,x_2)=|x_1-x_2|$. At the root level 800, we have 4 grids: [0, $k_1$) 805, [$k_1$,$k_2$) 810, [$k_2$,$k_3$) 815, and [$k_3$,K) 820. The grids are defined by (i) grid point, (ii) radius, (iii) limitations that prevent overlap between the grids. These grids can be defined as:

$G1=\{O(k_1/2,k_1/2); \text{ no } k_1\}$.

$G_2=\{O((k_1+k_2)/2, (k_2-k_1)/2); \text{ no } k_2\}$.

$G_3=\{O((k_2+k_3)/2, (k_3-k_2)/2); \text{ no } k_3\}$.

$G_4=\{O((k_3+K)/2, (K-k_3)/2)\}$.

Partition points, $k_1$, $k_2$, $k_3$ are chosen, such that all the grids have about equal number of points inside them, rendering the tree balanced. As show, each grid maintains a subtree, such that grid 1 (805) is connected to subtree 1 (825), grid 2 (810) is connected to subtree 2 (830), grid 3 (815) is connected to subtree 3 (835), and grid 4 (820) is connected to subtree 4 (840). Each subtree can be further divided until some chosen level "I" such that each grid $G_{ij}$, has $\geq M/2$ and less than M members. The resultant multigrid tree is balanced with an order M.

The process of building the B-grid tree of FIG. 6A is described by the flow diagram of FIG. 5. This method is a slightly modified approach compared with the B-tree definitions described by R. Bayer and E. McCreight, "Organization and Maintenance of Large Ordered Indexes," Acta Informatica. 1:173–189 (1970), which is herein incorporated by reference. The B-grid tree of FIG. 6A maintains each subtree within its parent grid; whereas in the conventional B-tree definition, the subtree is either to the left or right of its parent node. This slight difference makes the B-grid tree concept uniform to all space dimensions in a metric space.

FIG. 8B shows an exemplary B-grid tree of order 4 in a 2-dimensioanl metric space. Similar to the B-grid tree of FIG. 8A, each grid is defined by a grid point 850, a radius 855, and some descriptions 860. A shown, there are four grids $g_1$ (865), $g_2$ (870), $g_3$ (875), and $g_4$ (880). The neighborhoods defined by the grid points and the radii may be overlapping, but as the descriptions indicate, these neighborhoods exist separate and apart. Thus, the grids at the same level have no overlapping regions (points). The descriptions are provided to assign the points in overlapping regions to one of the grids.

Application of Data Search Using Metric Space, B-Grid Trees, and Multigrid Indexes The systems and methods of the present invention may be deployed in various computing environments to provide efficient data search capabilities. For example, the present invention may facilitate word searches in spell checkers, text searches in Internet-base search engines, vector searches in map computing applications, and most importantly in biological sequence search and extrapolation.

In the context of biological sequence searches, the data search systems and methods of the present invention would drastically increase efficiency while reducing computational complexity. This notion is illustrated using the following example. For purposes of this example, it is assumed that the biological sequence data set is stored on a database. A metric space can be developed for the biological sequence data such that a B-grid tree is generated for the data set and subsequently the B-grid tree searched for exact and approximate matches for a submitted search query. The approximation methods when used with currently available searching algorithms, such as, Smith-Waterman, FASTA, and BLAST, significantly increase processing efficiency by many folds.

First the distance between two sequences in the biological data set are calculated. In addition, a global sequence alignment is determined. For example, let $S_1$ and $S_2$ be two sequences (amino-acid or nucleotide) of length$\leq L$ of the biological sequence data set. The evolutionary distance (ED) $d(S_1,S_2)$ is defined as the minimal cost required to mutate $S_1$ to $S_2$:

$d(S_1,S_2)=\text{min\_cost}(\text{path connecting } S_1 \text{ and } S_2)$

Mutation steps can be point mutation or insertion/deletions (indels). Different costs (positive values) are predefined for different mutations. Indels should carry a higher penalty than point mutations. Also gap initiation cost may be different from its elongation. For example, nucleotide sequence comparison, one can assign a score-matrix for A→T, or A→G, A→C mutations. This same rule applies to amino-acid sequence comparisons, i.e. one can use BLOSUM or PAM matrices to calculate a cost matrix for point mutations. The final distance matrix for all possible mutations and indels has to form a positive definite matrix, i.e., also symmetric.

Using the foregoing, it is assumed that a collection of certain points in the space of sequence with length$\leq L$ with the above defined distance forms a metric space. Namely function d( . , . ) satisfies the following conditions:

$d(S_1,S_2) \geq 0.$ $d(S_1,S_2)=0$ if $S_1=S_2.$ $d(S_1,S_2) \leq d(S_1,S_3)+d(S_2,S_3).$ The art describes that Needleman-Wunsch (described above) alignment between two sequences is a global alignment of sequence similarity based on a substitution matrix. It is generally achieved through dynamic programming, and actually gives the "similarity" between two sequences. It has been shown that once given a sequence similarity, the distance between the sequences can be calculated using a simple formula as described in Setubal and Meidanis, "Introduction to Computational Molecular Biology," (1997), which is herein incorporated by reference.

The search methods and systems for the created metric space can be applied here. For example, a certain protein sequence database, (e.g., GenPept, or SwissPro), or cDNA or mRNA sequence database (e.g. gbpri with introns cleaned out), or fragmented cDNA sequences (e.g. dbEST), with an upper limit on sequence length L is provided. First, a transition matrix is picked to make the database in question fit into a metric space. Using the Needleman-Wunsch alignment to obtain distance between any two sequences, a balanced multigrid tree (B-grid tree) is created according to the steps described in FIG. 5. In this case, it can be calculated that it will take O(NlogN) Needleman-Wunsch global alignments to generate the tree for the database having N entries. Once generated, the searching of homologous sequence can be performed according to the processing described in FIG. 4. In this example, a query sequence is provided such that points must be chosen on the multigrid tree to satisfy the condition, $\epsilon > 0$ for the neighborhood (e.g. a $\epsilon$ is chosen to match a certain p-value). To meet this condition, the tree is searched for matching points such that each grid point is compared to the query using the Needleman-Wunsch algorithm until a leaf of the tree is found that will satisfy the stated condition. A report of all relevant homologies is provided. Included in the report is a list of the Needleman-Wunsch alignments between the query and all of its homologies.

To increase processing efficiencies, the present invention can be extended beyond providing exact matches and be adapted to current sorting algorithms to provide approximate results for a submitted search query. Following, a few heuristic algorithms are provided based on using prior search algorithms. All those method are approximate methods. As such, these methods will not yield as good as a result as good as the B-grid tree method based on the Needleman-Wunsch global alignment (i.e. search method described above). Further, these methods may provide even less matches compared with the current stand alone search algorithms, such as, Smith-Waterman, FASTA, and BLAST because of the approximation steps that are performed when estimating distances. Also, the search tree generated may be not a balanced one. However, each of the methods listed below yield much faster algorithms compared with current search algorithms, such as, Smith-Waterman, FASTA, and BLAST.

The most commonly used alignment methods are the local alignment methods (e.g. Smith-Waterman), and heuristic methods including FASTA, and BLAST, which uses certain filters to pre-filter large data sets before finer alignments are performed. These methods yield segmented alignments with a score, and a p-value (i.e. depending on the statistics each method uses). In order to take advantage of these search algorithms, and to use the metric-sorting method developed here, a construct, called a local distance is defined. A local distance is not a distance for the whole metric space, but it gives a good approximation of the real distance between two data elements, provided the two data elements are close to each other.

For example, function $d_a(s_1,s_2)$ in sequence space X can be defined as a local distance (LD) between sequence $S_1$ and $S_2$, provided that:

$d_a(s_1,s_2) \geq 0$ for any $s_1,s_2 \cdot d_a(s_1,s_2)=d_a(s_2,s_1).$ $d_a(s_1,s_2)=0$ iff $s_1=s_2.$ If $d(s_1,s_2)<L$, then $d_a(s_1,s_2) \leq d_a(s_1,s_3)+d_a(s_2,s_3).$ If $d(s_1,s_2) \geq L$, then $d_a(s_1,s_2)=L$ (maximal local distance within sequence space $X$)

The space with a metric defined above may be considered the local metric space. Once a local alignment with its score and p-value is determined, the above-defined a $d_a(s_{1,s2})$ can be calculated. This local distance will be close to the actual distance (i.e. metric space distance) if the two sequences are somehow related. On the other hand, if the local alignment generates a very poor alignment, or no alignment at all, then the euqation $d_a(s_1,s_2)=L$, holds true.

Figure 9:
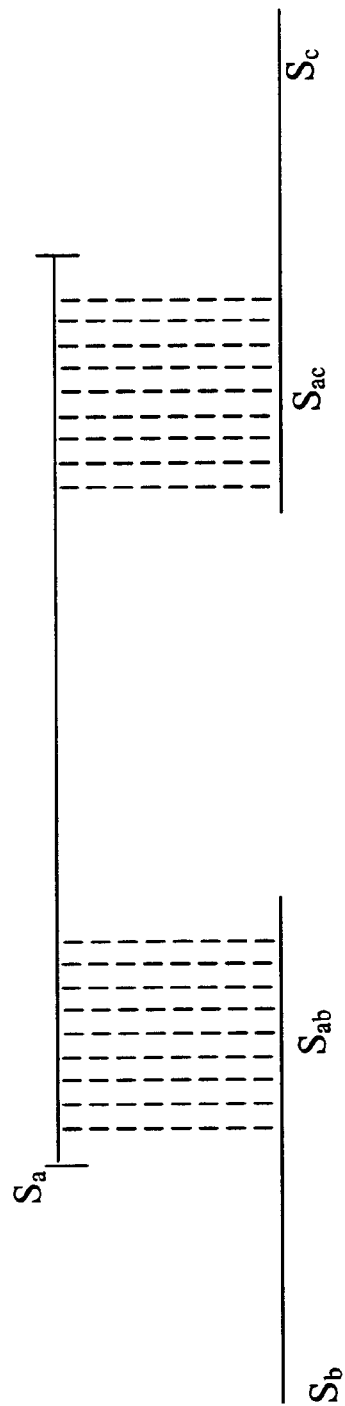
FIG. 9 is a block diagram showing the calculation of a local distance based on local sequence (for exemplary DNA or protein sequences) alignments in accordance with the present invention.

A local alignment can be transformed into a local distance function. For example, $S_a$, $S_b$, $S_c$, having a local alignment shown in FIG. 9 is provided. It is assumed that in the overlapped region, the match is 100%. We define $d_a(S_1,S_2)=$ len$(S_1)$+len$(S_2)$−2 len$(S_1S_2)$, where len( ) is the length of a sequence, and $S_1S_2$ define the overlapped region. As such, $d_a(S_a,S_b)=$len$(S_a)$+len$(S_b)$−2 len$(S_aS_b)$;

$d_a(S_a,S_c)=$len$(S_a)$+len$(S_c)$−2 len$(S_aS_c)$;

$d_a(S_b,S_c)=$len$(S_b)$+len$(S_c)$; and $d_a(S_a,S_b)+d_a(S_a,S_c)=$len$(S$ b)+len$(S_c)$+2(len$(S_a)$−len$(S_aS_b)$−len$(S_aS$ c))$\geq$len$(S_b)$+len$(S_c)=d_a(S_b,S_c)$ since len$(S$ a)−len$(S_aS_b)$−len$(S_aS_c)>0.$ Using these equations, the above-defined local distance based on a local alignment can be considered a local metric space.

Because the local distance is a metric, the local structures of a metric space will essentially be untouched in a local metric space. On the other hand, as part of the transformation some global structures associated with the metric space are lost. Specifically, depending on how good the local distance is, we will not be able to associate the whole data set together, i.e., for many sequences which are far apart, we can not tell how far apart they are from each other. Depending on the data set content, what may result is a fragmented space, or many local spaces. This fragmentation prevents the development of a complete multigrid search tree having an arbitrary order M. However, this process yields small searchable spaces. These spaces are building blocks for heuristic fast searching algorithms detailed below.

Ongoing, the distance that is discussed is the local distance that is generated from one of the local alignment methods. The search methods thus derived will be another level of approximation to the methods of the present invention. The approximation is a trade off to obtain resultant faster algorithms.

Usually the entries to a database (i.e. data set) may be very non-homogenous in length. For example, large genomic segments can be mixed together with cDNA sequences. In order to build an efficient search algorithms, the input data is first homogenized. This can be achieved through extending sequences for short segments and chopping long sequences into smaller segments through the use of sliding window. We first pick a typical window size "w" such that the majority of the entries is in the order of "w", say between 0.5*"w" to 2*"w" in length. Once "w" is chosen, the following steps are followed to handle the sequences that are longer or shorter than w:

For sequences within [0.5*"w", 2*"w"], we do not alter the sequence.

For sequences <0.5*"w" in length, the sequence is extended to length "w", by inserting equal number of N (indicating an uncertain base for DNA), or U (indicating Undetermined amino-acid sequence). In the cost-matrix, an average cost for those uncertainties can be used, instead of assuming a mismatch. An alternative approach is not to perform any adjustments in preprocessing for short sequences. Instead, at the indexing step, the local distance is adjusted by performing a similarity extension. As a result, the shorter alignment is extended to a length w, assuming the missing part has the same alignment characteristics like that of the given part. In this way, the local distance calculated may be smaller because as the insertion penalty is avoided.

For those sequences with length >2*"w", the sequence is partitioned by windows of size "w." Each time, the number of bases can be shifted, for example, w/4 number of bases. The determining factor when choosing number of bases to shift is: if a query sequence has an exact match to one of the sequence in the database, then it will align with a certain sequence in at least over 75% in one of the partitioned windows. This may result in some extra sequence comparisons. However, it may be better to err on the side of safety and undertake additional computations than to forgo potential data matches. Once homogenized, the data can be translated into a metric space for searching. For example, for a given database, it is broken into $\delta$-grid. $\delta$ is a positive number defined as: for the given $\delta$, the database can be partitioned into groups of sequences. Within each group, there is $\phi[i]$, such that $$d_a(\phi,\phi[i]) <= \delta \text{ for any } \phi \text{ in the group.}$$

The collection of $\{\phi[i]: i=1, \ldots, N_\delta\}$ is the $\delta$-grid. Any sequence in the database belongs to 1 and only 1 of the grids. If one sequence belongs to multiple $\delta$-grids, a single one (arbitrary) should be chosen.

Ideally, a minimal $\delta$-grid that covers the entire database is desired. However, for purposes of this example, the following steps may be followed to find one $\delta$-grid (not necessarily the minimal $\delta$-grid):

1. Pick the first sequence in the database as $\phi[1]$;
2. Check the next sequence $\phi$, if $d_a(\phi,\phi[1])>\delta, \phi[2]=\phi$; else, continue;
3. Suppose BaseSet=$\{\phi[1], \ldots, \phi[k]\}$ is provided, define:

$$d_{2\text{-}base}(\phi,\text{BaseSet})=\min_i(d_a(\phi,\phi[i]), 1<=i<=k);$$

if $d_{2\text{-}base}(\phi,\text{BaseSet})>\delta$, then choose $\phi[k+1]=\phi$; and 4. Repeat steps 1–3 until the end of the database.

Once the $\delta$-grid is determined the search processing may be performed. For example, given query sequence "q", and database X of the same type (either amino-acid or nucleotide acid), and $\epsilon>0$, and $\delta>0$. If $$d_a(q,\phi[i])>\delta+\epsilon$$

then, there is no $\phi$ in $O(\phi[i],\delta)(\phi[i]$'s $\delta$-neighborhood as determined by $d_a$) such that:

$$d_a(q,\phi) \leq \epsilon.$$

To simplify the description, the set $(\phi[i], i=1, \ldots, k)$ may be considered as the grid points, or grid sequences. Based on the above conditions, one can see, if a grid sequence is distant enough from the query sequence, no sequence in this grid (i.e. its $\delta$-neighborhood) needs to be searched further. Accordingly, the number of sequence comparisons can be reduced linearly by comparing the query sequence with each grid sequence first. However, if a grid sequence satisfies: $d_a(q,\phi[i])<=\delta+\epsilon$, the query sequence is compared with other sequences in $O(\phi[i],\delta)$.

Once the local alignments between the sequences are determined, clusters of sequences based on their similarity can be created. Sequences within a cluster are either directly related, or they are related by some connection (sequence A is directly related to B, and B to C; thus A and C are related by a connection). Those clusters will be the starting points for building a search structure. A key consideration becomes s how to select the grid point efficiently based on the calculated sequence clusters.

For example, a cluster of sequences $\{S_i, i=1, \ldots, I\}$ is provided and it is desired to pick a $G_I$ (i.e. a grid point), such that, $$\min_G \Sigma d_a(Si,G) \text{ for all } i, i=1, \ldots, I.$$

$G_I$ may doe not have to be unique and one $G_I$ is required. One way to get an approximate grid point is to use multiple-sequence alignment tools and perform a read out (similar to sequence assembly) based on the alignment result. Once the $G_I$ is picked, the structure may be refined by eliminating points in the cluster that do not fall into a $\delta$-neighborhood of $G_I$.

From here the approximate search processing proceeds as follows. Suppose a N*N local distance matrix for all the N-sequences in the database is provided. A series of $\{\delta_i, i=1, ,, n, \delta_i<L, \text{ and } \delta_i>\delta_{i+1}\}$ can be chosen to define the database. First a grid set is generated of the whole space at each grid-level. Each BS-$\delta_i$ is then mapped into BS-$\delta_{i-1}$. By doing this, a search-tree can be constructed starting from the crudest grids to the more refined grids that reside down the tree. The generated grid tree can be searched for desired data elements. The searching complexity based on the above generated multigrid may approach a computational complexity of O(logN) for an exact-matching search, provided the tree generated is somewhat balanced. Depending on the nature of the entries, the tree will most likely be a segmented. That is, there will be subtrees scattered around the metric space, with local isolated points. On the locations where the sequences are clustered, the branches may go a few layers. As a result, the tree may become very unbalanced.

Figure 10:
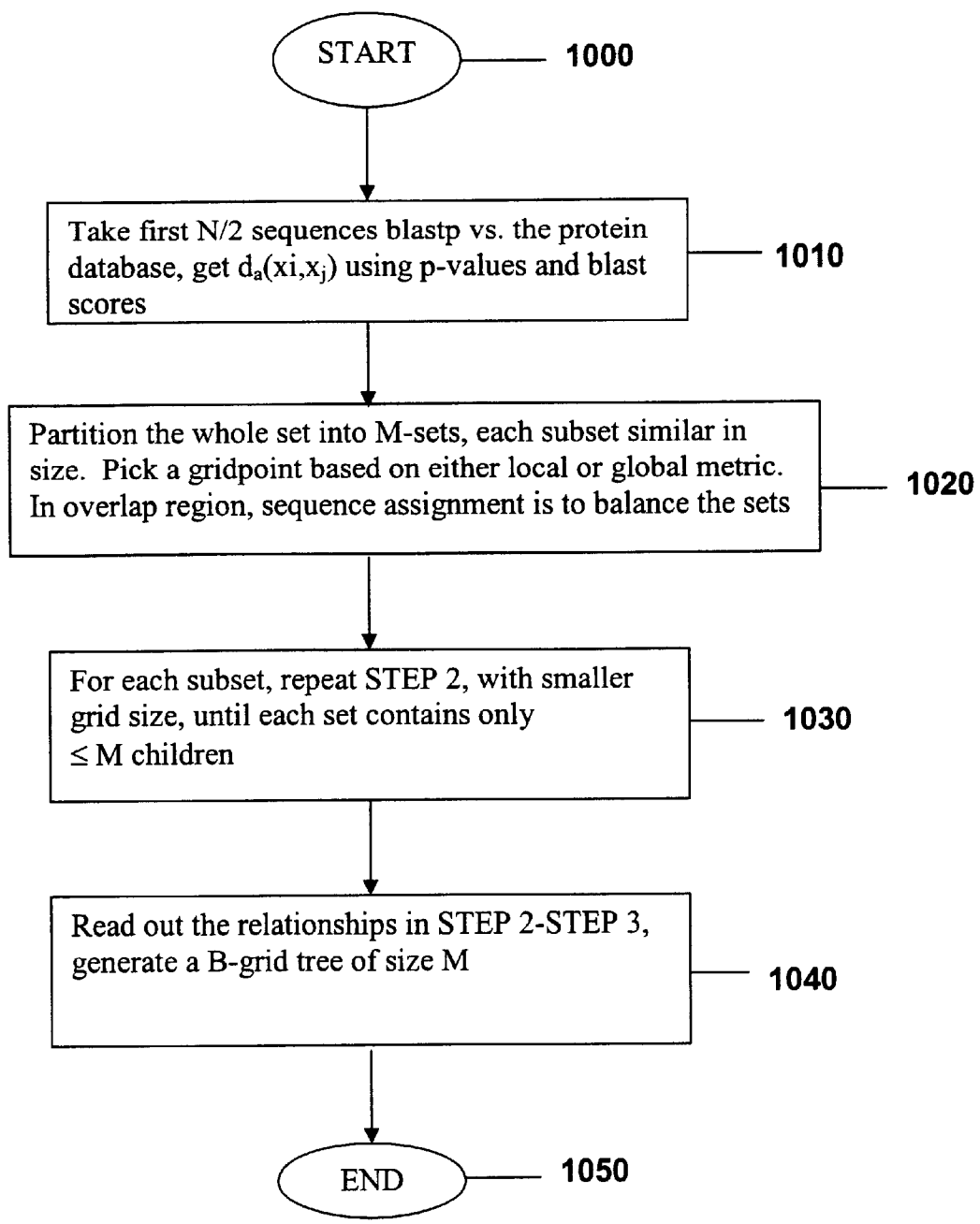
FIG. 10 is a flow diagram of the processing performed when developing a B-grid tree of order M for an exemplary protein database based on local distance using BLASTP statistics in accordance with the present invention.

Even with the above steps the computational time for generating a search-tree, or the actual searching of the tree can be computationally extensive, especially when $\epsilon$ is large (searching for distant homologies). For example, suppose a protein database of size N is provided. It is assumed that $O(N^2)$ approximation method is used to generate a perfectly balanced multigrid tree of order M. The method is shown in FIG. 10. As shown in FIG. 10, processing begins at block 1000 and proceeds to block 1010 where the first N/2 sequences of the N size database are searched using the BLASTP search algorithm against the protein database. The distance function is calculated for these entries and the BLAST scores determined. Specifically, at block 1010, local similarity matrix is generated using BLASTP in the BLAST package to BLAST the first N/2 members vs. the whole database. The global distance matrix ($d_{ij}$, for all i,j, 0 ... N) is then approximated by using the similarity matrix as described in Setubal and Meridanis, "Introduction to Computational and Molecular Biology," pp. 89–96 PWS Publishing Co. 1997, which is herein incorporated by reference. Processing then proceeds to block 1020, where the whole set is partitioned into M-sets, where each subset is similar in size using a clustering method. A grid point is chosen either using a local or global metric. Where there are overlapping regions, sequence assignments are used to balance the sets. Specifically, if all of the sequences within a cluster can be included using a radius for a local distance, the grid may be defined as local-distance grid, or simply a local grid. If the points are far apart from each other, a global alignment is used to calculate the distance among the sequences, and global radius is generated instead. Correspondingly, this grid is marked as a global-distance grid, or simply a global grid. Processing then proceeds to block 1030 where the processing of block 1020 is repeated for each created subset with smaller grid sizes until each set contains only $\leq M$ children. Processing then proceeds to block 840 where the relationships from block 1020 and 1030 are read to generate a B-grid tree of size M. Processing then terminates at block 1050. The resultant B-grid tree is an approximate tree. Generally, the search performed on this approximated B-tree grid will provide as good results as the BLASTP method can generate.

Figure 11:
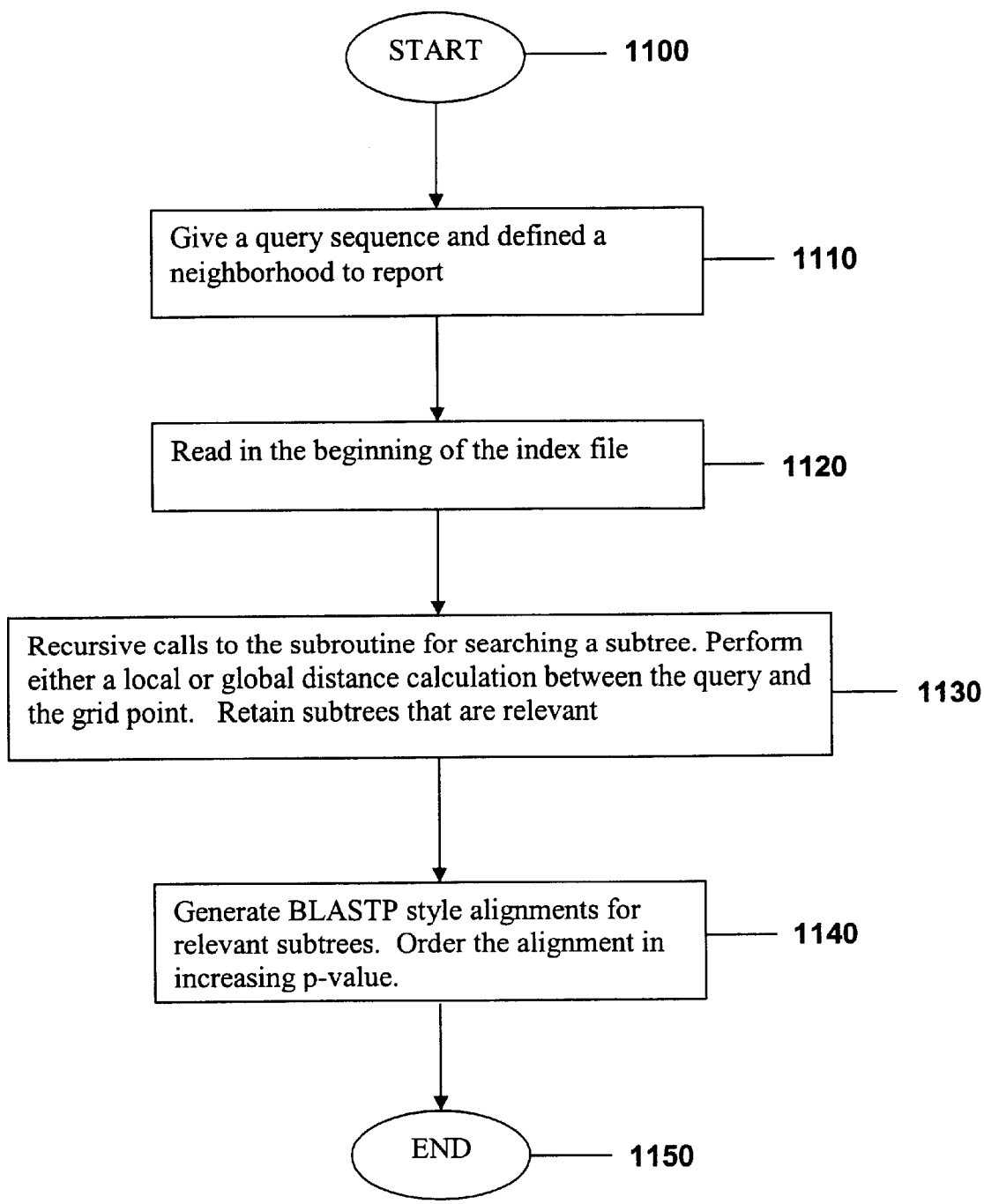
FIG. 11 is a flow diagram of the processing performed when searching the B-grid tree to generate BLASTP equivalent outputs in accordance with the present invention.

FIG. 11 shows how to search a B-grid tree to generate BLASTP-equivalent outputs. The result of the processing described in FIG. 10 generates a balanced B-grid tree, having global distances in upper layers, and local distances down toward the leaf. Searching this tree can be performed through an efficient search method that yields BLASTP equivalent results. If the grid is a global grid, the global distance between the query and the grid point is calculated; if it is a local grid, the local distance is calculated instead. Either way, a decision on whether to drop the grid using the triangle inequality can be made. Since the tree takes $O(N^2)$ steps to generate it, the generated tree becomes a precious commodity. In application, the big bioinformatics centers can distribute the database, together with its indexes. Generated once at a center, the approximation B-grid tree can be used by those who obtain or have access to the database.

FIG. 11 provides a flow chart that describes the processing performed to search the generated approximate B-grid tree generated by FIG. 10. As shown in FIG. 11, search processing begins at block 1100 and proceeds to block 1110 where a query sequence is obtained. In addition a neighborhood for the query sequence is reported. The beginning of the index file is then read in at block 1120. Processing then proceeds to block 1130 where the subroutine for searching the subtree is called recursively. The searching subroutine performs either a local or global distance calculation between the query and the grid point. In addition, at block 1130, any subtree that is deemed relevant is kept. Processing then proceeds to block 1140 where BLASTP type alignments are generated for all entries that are considered relevant. The alignment order is performed such that there is an increasing p-value of the alignments. Processing then terminates at block 1150.

Conclusion

In sum, the present invention provides systems and methods for data search using metric space, multigrid indexes, and b-grid trees. It is understood, however, that the invention is susceptible to various modifications and alternative constructions. There is no intention to limit the invention to the specific constructions described herein. On the contrary, the invention is intended to cover all modifications, alternative constructions, and equivalents falling within the scope and spirit of the invention.

It should also be noted that the present invention may be implemented in a variety of computer systems. The various techniques described herein may be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system may also be implemented as a computer-readable storage medium, configured with a computer program, where the storage medium so configured causes a computer to operate in a specific and predefined manner. Further, the storage elements of the exemplary computing applications may be relational or sequential (flat file) type computing databases that are capable of storing data in various combinations and configurations.

Although exemplary embodiments of the invention has been described in detail above, those skilled in the art will readily appreciate that many additional modifications are possible in the exemplary embodiments without materially departing from the novel teachings and advantages of the invention. Accordingly, these and all such modifications are intended to be included within the scope of this invention construed in breadth and scope in accordance with the appended claims.

What is claimed is:

1. A computer implemented method to search data via a query comprising the acts of:

creating a multigrid tree taxonomy in metric space for said data using distance functions; and comparing said query with said multi-grid tree taxonomy to find matches within a given neighborhood of said query.

2. The method recited in claim 1, wherein said creating step further comprises the act of constructing at least one grid, said grid having a grid point, radius, and descriptors that define the scope of the data elements of said data residing in said grids.

3. The method recited in claim 2, wherein said grid point exists outside of said data.

4. The method recited in claim 2, wherein said creating step further comprises the acts of identifying a root grid, and constructing children grids for connection to said root grid and to constructed said children grids, said connection of children grids to said root grid creating a tree branch at a first level, and said connection of children grids to said connected children grids creating a tree branch at a second level, said children grids constructed and connected until all of said data is represented in said tree.

5. The method recited in claim 4, wherein said radius of said grids decrease in size the further the grid is away from said identified root.

6. The method recited in claim 4, wherein said creating step is realized by performing distance calculations on said data in metric space.

7. The method recited in claim 4, wherein said creating step produces a balanced multigrid tree, said balanced multigrid tree (B-grid tree) having distributed a uniform number of data elements in said grids, and a uniform number of grids on said levels of said tree.

8. The method recited in claim 7, wherein said creating step produces a B-grid tree having non-overlapping grids.

9. The method recited in claim 1, wherein said comparing step further comprises the steps of calculating distance functions on said multi-grid tree to eliminate grids that do not contain desired data elements and reporting matches from those grids that could contain desired data elements.

10. The method recited in claim 9, wherein said comparing step is realized by verifying the triangle inequality of metric space distance functions.

11. The method recited in claim 1 or 7, wherein said creating act further comprising the acts of calculating distances in metric space comprising any of global distance and local distance.

12. A computer readable storage medium comprising computer-executable instructions for instructing a computer to perform the acts recited in claim 1.

13. A system to provide efficient data searches comprising:
    a data store containing data; and
    a computing application cooperating with said data store, said computing application having a user interface to accept search queries and processing abilities to process said data of said data store to create a balanced multigrid tree (B-grid tree), said B-grid tree representative of said data of said data store.

14. The system recited in claim 13, wherein said computing application creates said B-grid tree by transposing said processed data into metric space, said computing application calculating distance functions for said data to construct at least one grid, having a grid point, a radius and descriptors, said grid representative of a subset of said data, said at least one grid acting as a component of a grid tree which comprises a root level and plurality of branch levels such that a plurality of grids can reside on a given level of said tree, said tree having as many levels as required to fully represent said data.

15. The system recited in claim 14, wherein said at least one grid is placed on said one of a plurality of branch levels based on the results of a distance function calculation performed by said computing application.

16. The system recited in claim 15, wherein grids have decreasing radii with increasing levels apart from said root level.

17. The system recited in claim 13, wherein a grid point of said B-tree grid is not representative of a data element of said data.

18. The system recited in claim 13, wherein said data store resides on a database.

19. The system recited in claim 18, wherein said data comprises any of words of a dictionary, biological sequence data, map vectors, keyword list for scientific literature, and Internet based addressing information.

20. The system recited in claim 18, wherein said database is part of said computing application.

21. The system recited in claim 13, wherein said data store resides on a computer server that communicates to said computing application over a communications network comprising any of a LAN, WAN, an intranet, and the Internet.

22. The system recited in claim 20, wherein said computer server hosting said data store comprises any of a storage area network (SAN) and distributive storage and processing systems (peer-to-peer).

23. The system recited in claim 13, wherein said computing application comprises a Web browser computing application.

24. The system recited in claim 22, wherein said Web browser computing application executes code comprising of a JAVA applet, JAVA script, HTML, HTML script, XML, WML, and HDML to create said B-grid tree index.

25. A method to provide searchable biological sequencing data comprising the acts of:
    storing biological sequence data in a easy to distribute format, such that said data is represented by a B-grid tree in metric space; and
    distributing said updated biological sequence data having said B-grid tree.

26. The method recited in claim 25 further comprising the act of updating said biological sequence data with new biological sequence information, said B-grid tree being regenerated when said biological sequence data is updated.

27. In a computing system having a data store containing data, a method to search data to provide approximate search results comprising the steps of:
    processing said data by a computing application, said computing application performing a sort of said data using an approximation sequence comparison algorithm; and
    creating a B-grid tree for said data by said computing application such that said B-grid tree is representative of said data of said data store.

28. The method recited in claim 27, wherein said processing step further comprises the step of choosing the approximation sequence comparison algorithm to employ to index said data, said indexing algorithm comprising any of FASTA, FASTB, BLAST, and BLASTP approximation sequence comparison algorithm.

29. The method recited in claim 27, further comprising the steps of comparing a search query received by said computing application against said created B-grid tree to determine matches between said received search query and said data of said data store.

* * * * *

UNITED STATES PATENT AND TRADEMARK OFFICE
CERTIFICATE OF CORRECTION

PATENT NO. : 6,636,849 B1
DATED : October 21, 2003
INVENTOR(S) : Yuanhua Tom Tang and Yonghong Grace Yang It is certified that error appears in the above-identified patent and that said Letters Patent is hereby corrected as shown below:

Column 5,
Line 43, delete "searh" and insert -- search -- therefor;

Column 13,
Line 45, delete "G1=" and insert -- $G_1=$ -- therefor;

Column 14,
Line 8, delete "A" and insert -- As -- therefor;

Column 15,
Line 48, delete the third occurrence of "as" and insert -- of -- therefor;
Line 49, delete "as good";

Column 16,
Line 11, delete "$d_a(S_1,S_2)=0$ iff $S_1=S_2$" and insert -- $d_a(S_1,S_2)=0$ if $S_1=S_2$ -- therefor;
Line 19, delete "$d_a(S_1,S_2)$" and insert -- $d_a(S_1,S_2)$ -- therefor;
Lines 39-43, delete "$d_a(S_a,S_b)+d_a(S_a,S_c)=len(Sb)+len(S_c)+2(len(S_a)–len(S_aS_b)–len(S_aSc)) \geq len(S_b)+len(S_c)=d_a(S_b,S_c)$ since $len(Sa)-len(S_aS_b)-len(S_aS_c) > 0$." and insert -- $d_a(S_a,S_b)+d_a(S_a,S_c)=len(S_b)+len(S_c)+2(len(S_a)–len(S_aS_b)–len(S_aS_c)) \geq len(S_b)+len(S_c)=d_a(S_b,S_c)$ since $len(S_a)-len(S_aS_b)-len(S_aS_c) \geq 0$. -- therefor;

Column 17,
Line 4, delete "algorithms" and insert -- algorithm -- therefor;
Line 27, delete "as";

Column 18,
Line 2, delete "$\epsilon>0$," and insert -- $\epsilon\geq 0$, -- therefor;
Line 34, delete "may doe" and insert -- does -- therefor;
Line 54, delete "a";

Column 19,
Line 29, delete "block" and insert -- blocks -- therefor;

UNITED STATES PATENT AND TRADEMARK OFFICE
CERTIFICATE OF CORRECTION

PATENT NO.   : 6,636,849 B1
DATED        : October 21, 2003
INVENTOR(S)  : Yuanhua Tom Tang and Yonghong Grace Yang It is certified that error appears in the above-identified patent and that said Letters Patent is hereby corrected as shown below:

Column 21,
Line 2, insert -- : -- after "of";

Column 22,
Line 25, delete "22" and insert -- 23 -- therefor;
Line 35, delete "updated";
Lines 58-59, delete "the steps of".

Signed and Sealed this

Twenty-third Day of December, 2003

JAMES E. ROGAN
*Director of the United States Patent and Trademark Office*